US011460790B2

(12) United States Patent
Matsuo et al.

(10) Patent No.: US 11,460,790 B2
(45) Date of Patent: Oct. 4, 2022

(54) OPTICAL SCANNING DEVICE AND IMAGE FORMING APPARATUS INCLUDING SAME

(71) Applicant: SHARP KABUSHIKI KAISHA, Osaka (JP)

(72) Inventors: Manabu Matsuo, Sakai (JP); Takaharu Motoyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 41 days.

(21) Appl. No.: 17/097,954

(22) Filed: Nov. 13, 2020

(65) Prior Publication Data
US 2021/0173322 A1 Jun. 10, 2021

(30) Foreign Application Priority Data

Dec. 10, 2019 (JP) .............................. JP2019-223129

(51) Int. Cl.
G03G 15/04 (2006.01)
G02B 3/06 (2006.01)
G02B 7/02 (2021.01)

(52) U.S. Cl.
CPC ......... *G03G 15/04036* (2013.01); *G02B 3/06* (2013.01); *G02B 7/022* (2013.01); *G02B 7/025* (2013.01)

(58) Field of Classification Search
CPC .. G03G 15/04036; G02B 7/022; G02B 7/023; G02B 7/025
See application file for complete search history.

(56) References Cited

U.S. PATENT DOCUMENTS

| 2006/0132880 | A1* | 6/2006 | Amada | G02B 26/127 |
| | | | | 359/221.2 |
| 2008/0212999 | A1* | 9/2008 | Masuda | G03G 15/326 |
| | | | | 356/450 |
| 2012/0162788 | A1* | 6/2012 | Luan | G02B 7/023 |
| | | | | 359/811 |
| 2016/0116758 | A1* | 4/2016 | Nomura | H04N 5/23287 |
| | | | | 359/557 |

FOREIGN PATENT DOCUMENTS

| JP | 2002-221682 A | 8/2002 |
| JP | 2004-109347 A | 4/2004 |
| JP | 2011-118134 A | 6/2011 |

* cited by examiner

*Primary Examiner* — Carla J Therrien

(74) *Attorney, Agent, or Firm* — ScienBiziP, P.C.

(57) ABSTRACT

An optical scanning device includes a light source that emits a light beam, a lens member, and a housing that supports the lens member. The housing and the lens member are provided with a housing-side engagement and a lens member-side engagement respectively that engage with each other. The housing-side engagement and the lens member-side engagement are capable of pivoting the lens member around an axis along an optical axis direction of the light beam passing through a contact contacted through concavo-convex engagement with each other.

15 Claims, 21 Drawing Sheets

OPTICAL SCANNING DEVICE AND IMAGE FORMING APPARATUS INCLUDING SAME

BACKGROUND OF THE INVENTION

Field of the Invention

The present invention relates to an optical scanning device and an image forming apparatus such as a copying machine, a multifunction machine, a printer device, and a facsimile device, including the same.

Description of the Background Art

An optical member configuring an optical system in an optical scanning device includes a lens member, for example, a lens member having a lens with a lens effect in one direction (for example, a cylindrical lens or a beam detection lens).

In such an optical scanning device, for example, if the lens member is inclined around an axis along an optical axis direction of a light beam with respect to a main scanning direction from a normal position, the following inconvenience arises.

FIG. 15 is a schematic diagram illustrating cross sectional shapes of a light beam L at an end Xa on a writing start side in a main scanning direction X1, at a center Xb in the main scanning direction X1, and at an end Xc on a writing end side therein, in a state where the light beam L emitted from an optical scanning device 200X with a lens member (214) being inclined around an axis along an optical axis direction S enters, with irradiation, an image surface 3a of a photoconductive drum 3. In an upper portion of FIG. 15, the cross sectional shapes of the light beam L at the end Xa on the writing start side in the main scanning direction X1, at the center Xb, and at the end Xc on the writing end side are illustrated, and in a lower portion thereof, an irradiation state of the light beam L emitted from the optical scanning device 200X is illustrated. Further, reference numerals 211, 215, and 223 indicate a light source, a reflection mirror for the light source, and a deflecting and scanning member (polygon mirror), respectively.

In the conventional optical scanning device 200X, for example, if the lens member is a cylindrical lens 214, when the cylindrical lens 214 is inclined around an axis along an optical axis direction S of the light beam L from a normal position, in a state where the light beam L emitted from the optical scanning device 200X enters, with irradiation, the image surface 3a of the photoconductive drum 3 (an object to be scanned), a cross-sectional shape (dot shape) of the light beam L is in an elliptical shape running along a diagonal direction with respect to the main scanning direction X1 at the end Xa on the writing start side in the main scanning direction X1, at the center Xb, and at the end Xc on the writing end side. This is particularly remarkable at the ends Xa and Xc on both sides in the main scanning direction X1. As a result, a resolution in an image formed on a recording material such as a recording paper is lowered, and in addition, it is difficult to ensure that toner surely adheres to a latent image, and there arises an inconvenience that the image is blurred at the ends Xa and Xc on both the sides in the main scanning direction X1.

Further, although not illustrated, when the lens member is a beam detection-use lens in the conventional optical scanning device, if the beam detection-use lens is inclined around an axis along the optical axis direction of the light beam L from a normal position, a detection accuracy of a beam detector deteriorates.

To resolve such an inconvenience, Japanese Unexamined Patent Application Publication No. 2004-109347 (Patent Document 1) discloses a feature that a sub scanning magnification of an entire scanning optical system is adjusted by moving a second cylindrical lens in the optical axis direction, to adjust an interval between scanning lines on a surface to be scanned. Japanese Unexamined Patent Application Publication No. 2011-118134 (Patent Document 2) discloses a feature that a unit in which an LD, a collimator lens, an aperture, an expander lens, a cylindrical lens are incorporated is rotated or moved in parallel to adjust an entering position to a reflection surface of a rotating polygon mirror, and as a result, uniform light irradiation over an object to be scanned is enabled without changing a relationship of an optical position or with reducing an influence on an optical performance. Further, Japanese Unexamined Patent Application Publication No. 2002-221682 (Patent Document 3) discloses a feature that if a main cylindrical lens and a sub cylindrical lens are individually moved in the optical axis direction to control a beam spot diameter, it is possible to adjust the beam spot diameter inexpensively and highly accurately.

However, in any of Patent Documents 1 to 3, it is not possible to suppress the inconvenience caused by the inclination around the axis along the optical axis direction of the light beam of the lens member.

Therefore, an object of the present invention is to provide an optical scanning device capable of effectively preventing an inconvenience caused by an inclination around an axis along an optical axis direction of a light beam of a lens member and an image forming apparatus provided therewith.

SUMMARY OF THE INVENTION

To resolve the above-described problems, the present invention provides an optical scanning device including a light source that emits a light beam, a lens member, and a housing that supports the lens member, in which the housing and the lens member are provided with a housing-side engagement and a lens member-side engagement respectively that engage with each other, and the housing-side engagement and the lens member-side engagement are capable of pivoting the lens member around an axis along an optical axis direction of the light beam passing through a contact contacted through concavo-convex engagement with each other.

Further, the present invention provides an image forming apparatus including an optical scanning device according to the present invention.

According to the present invention, it is possible to effectively prevent an inconvenience caused by an inclination of a lens member around an axis along an optical axis direction of a light beam.

DESCRIPTION OF THE PREFERRED EMBODIMENTS

Figure 1:
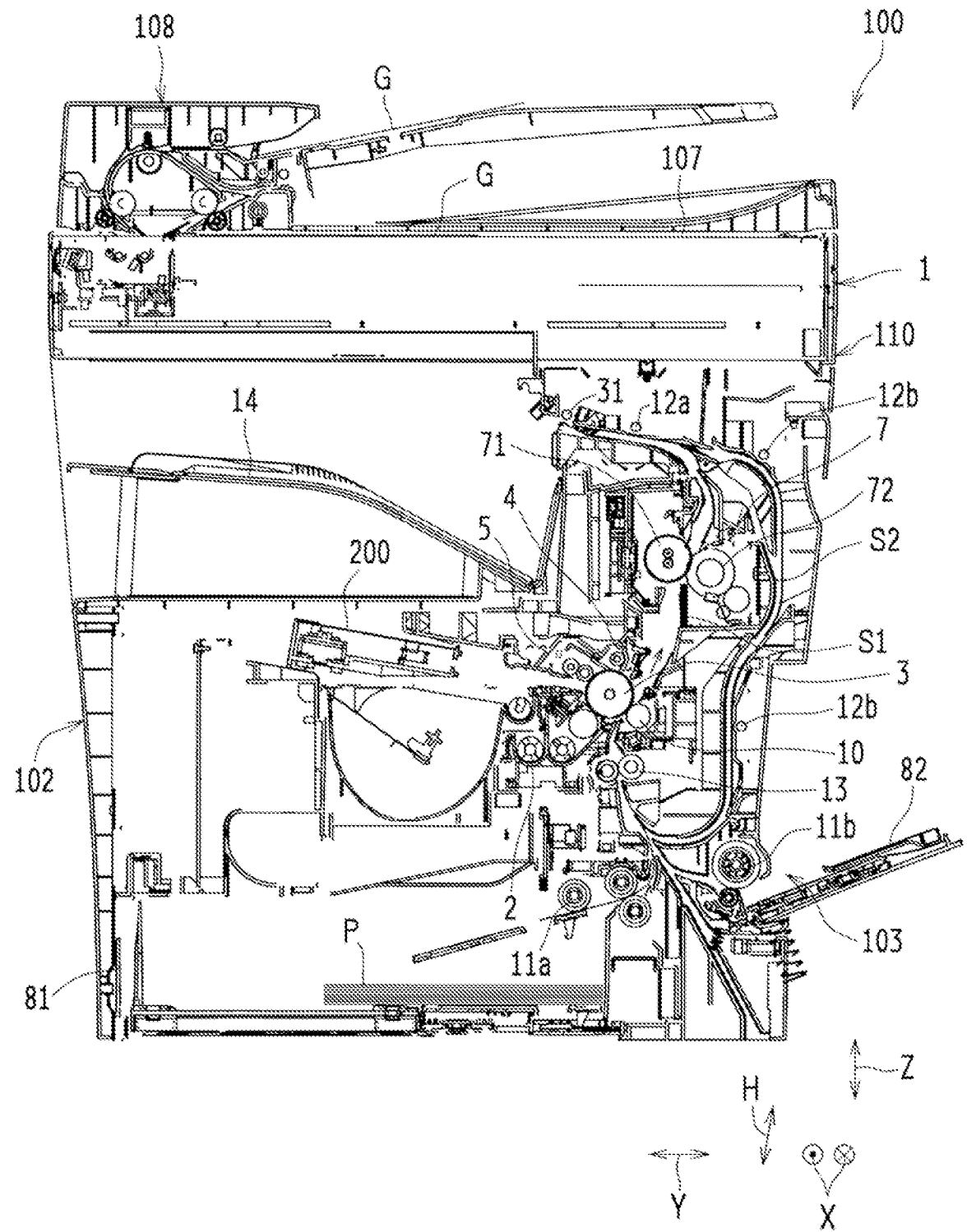
FIG. 1 is a schematic cross-sectional view of an image forming apparatus according to the present embodiment as viewed from a front.

An embodiment according to the present invention will be described below with reference to the drawings. In the following description, same parts are denoted by the same reference numerals. The names and functions of the same parts are also the same. Therefore, detailed description thereof will not be repeated.

Image Forming Apparatus

FIG. 1 is a schematic cross-sectional view of an image forming apparatus 100 according to the present embodiment as viewed from a front. In FIG. 1, reference symbol X represents a depth direction, reference symbol Y represents a main scanning direction, and reference symbol Z represents a vertical direction (a vertical direction, a rotation axis direction of a rotating polygon mirror), respectively.

The image forming apparatus 100 according to the present embodiment is a monochrome image forming apparatus. The image forming apparatus 100 performs an image forming process based on image data read by an image reading device 1 or image data transmitted from outside. It is noted that the image forming apparatus 100 may be a color image forming apparatus that forms a multicolored and monochromatic images on a paper P (a recording material such as a recording paper).

The image forming apparatus 100 includes a document feeding device 108 and an image forming apparatus main body 110. The image forming apparatus main body 110 is provided with an image former 102 and a paper transport system 103.

The image former 102 includes an optical scanning device 200 (optical scanner), a developer 2, a photoconductive drum 3 (photoconductor) acting as an electrostatic latent image carrier, a cleaner 4, a charging device 5, and a fusing unit 7. Further, the paper transport system 103 includes a paper feed tray 81, a manual paper feed tray 82, a discharge roller 31, and a discharge tray 14.

At an upper part of the image forming apparatus main body 110, the image reading device 1 that reads an image of a document G is provided. The image reading device 1 includes a document platen 107 on which the document G is placed. Further, above the document platen 107, the document feeding device 108 is provided. In the image forming apparatus 100, the image of the document G read by the image reading device 1 is sent, as image data, to the image forming apparatus main body 110 and the image is recorded on the paper P.

The image forming apparatus main body 110 is provided with a paper transport path S1. The paper feed tray 81 or the manual paper feed tray 82 supplies the paper P to the paper transport path S1. The paper transport path S1 guides the paper P to the discharge tray 14 via a transfer roller 10 and the fusing unit 7. The fusing unit 7 heats and fuses, onto the paper P, a toner image formed on the paper P. In the vicinity of the paper transport path S1, pickup rollers 11a and 11b, a transport roller 12a, a resist roller 13, the transfer roller 10, a heat roller 71 and a pressure roller 72 in the fusing unit 7, and the discharge roller 31 are arranged.

In the image forming apparatus 100, the paper P supplied by the paper feed tray 81 or the manual paper feed tray 82 is transported to the resist roller 13. Next, the paper P is transported to the transfer roller 10 by the resist roller 13 at a timing of matching the paper P with the toner image on the photoconductive drum 3. The toner image on the photoconductive drum 3 is transferred onto the paper P by the transfer roller 10. After that, the paper P passes through the heat roller 71 and the pressure roller 72 in the fusing unit 7, and is discharged onto the discharge tray 14 via the transport roller 12a and the discharge roller 31. If the image is formed not only on a front side of the paper P but also on a back side, the paper P is transported in a reverse direction from the discharge roller 31 to a reversal paper transport path S2. The front and back sides of the paper P are reversed via reversal transfer rollers 12b to 12b, and the paper P is guided again to the resist roller 13. Next, the paper P is discharged toward the discharge tray 14 after the toner image is formed and fused on the back side in much the same way as on the front side.

Optical Scanning Device

Figure 2:
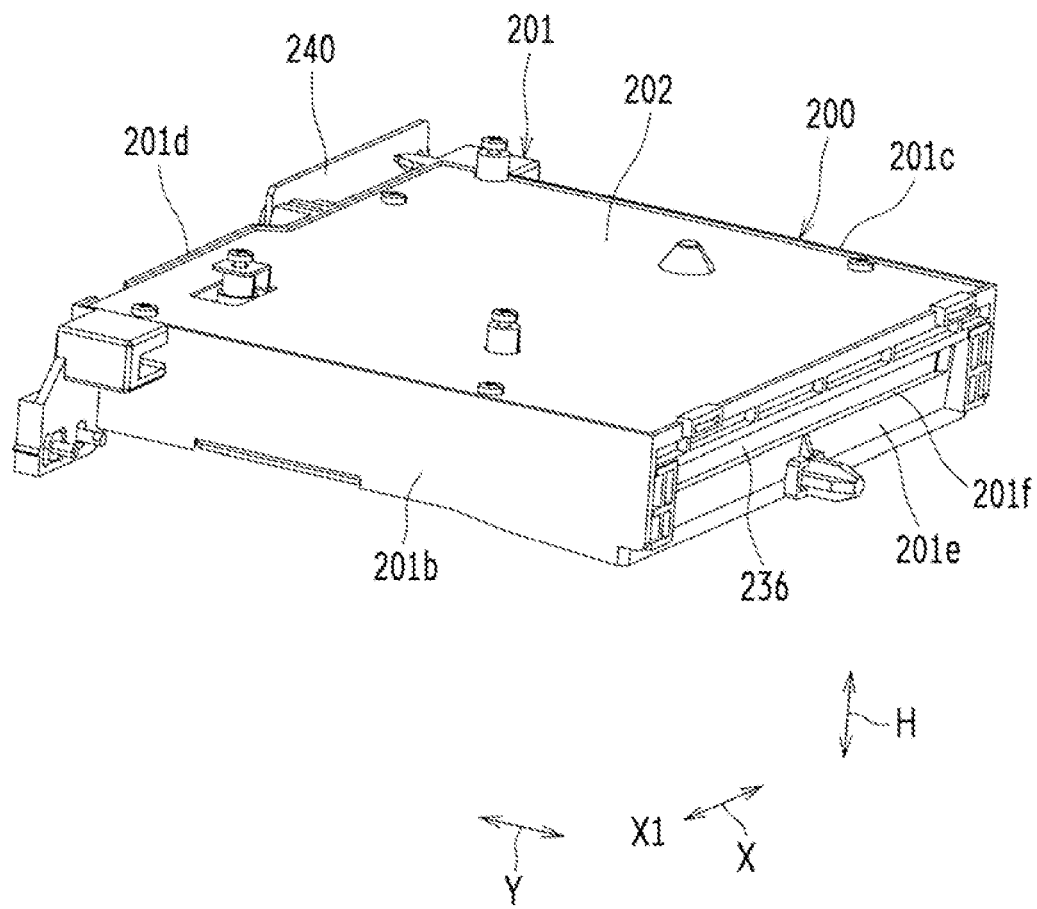
FIG. 2 is a perspective view obtained when an optical scanning device in the image forming apparatus illustrated in FIG. 1 is viewed from an upper right on a front side.
Figure 3:
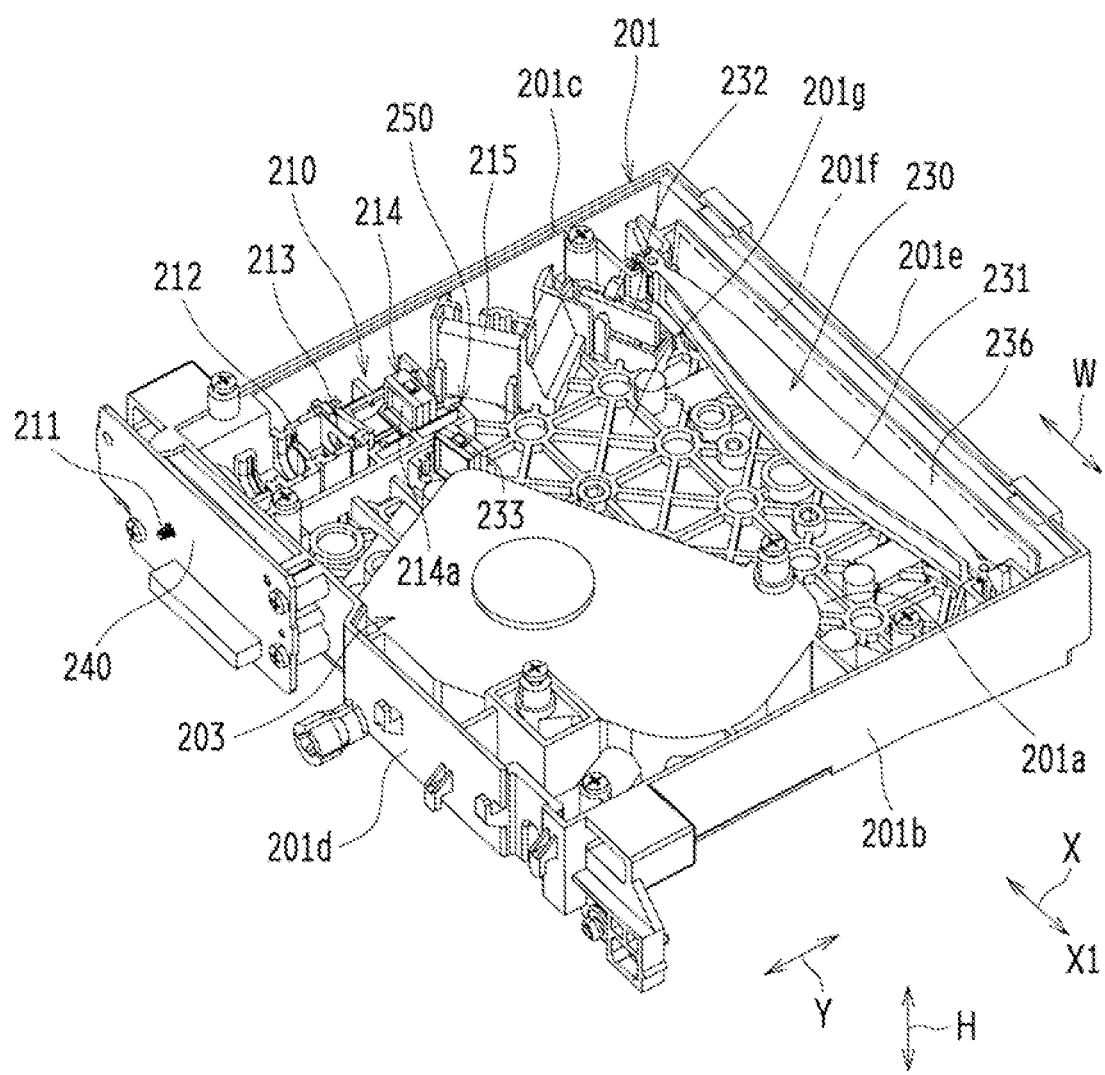
FIG. 3 is a perspective view of a state where an upper lid of the optical scanning device is removed is viewed from an upper left on the front side.
Figure 4:
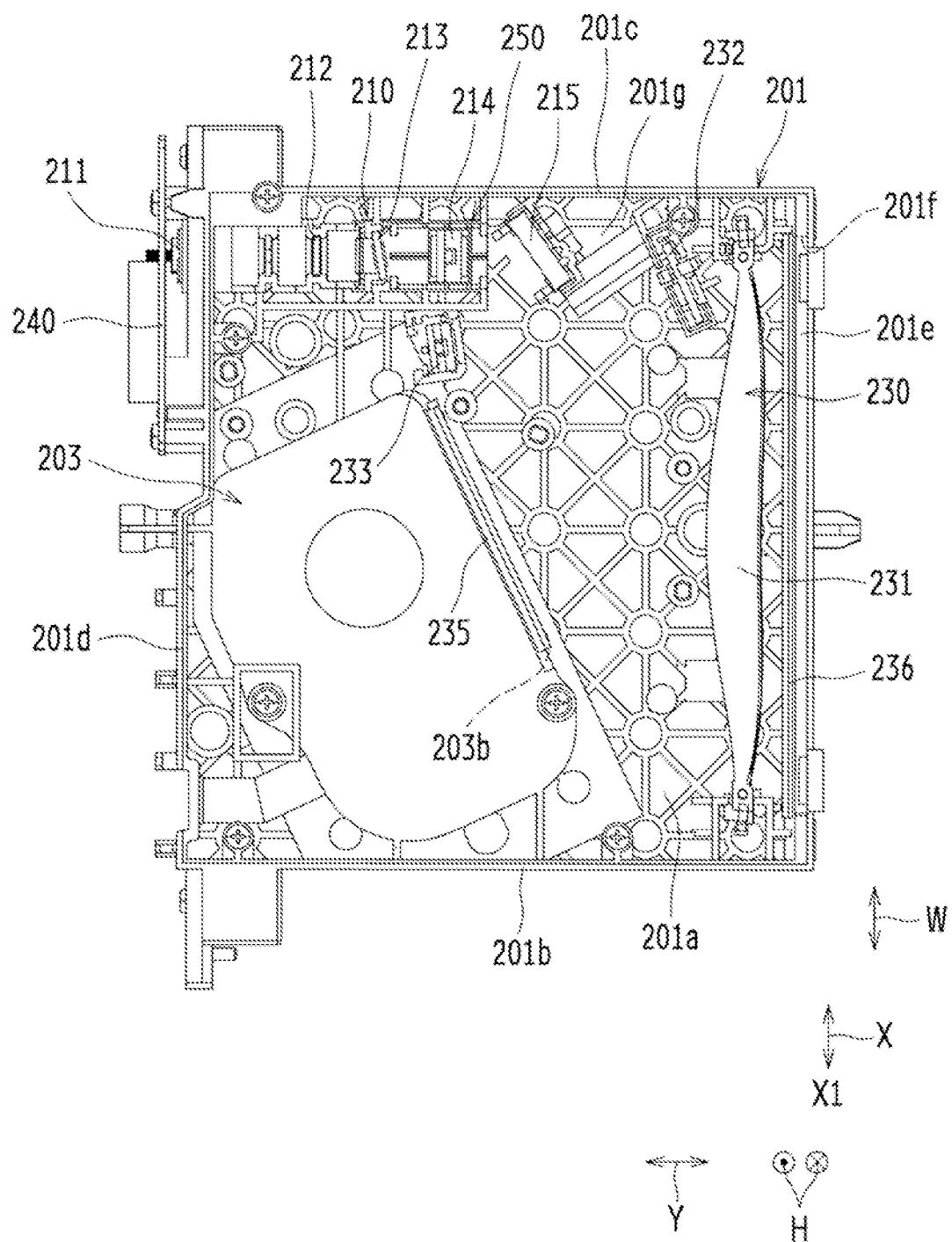
FIG. 4 is a plan view illustrating the optical scanning device illustrated in FIG. 3.
Figure 5:
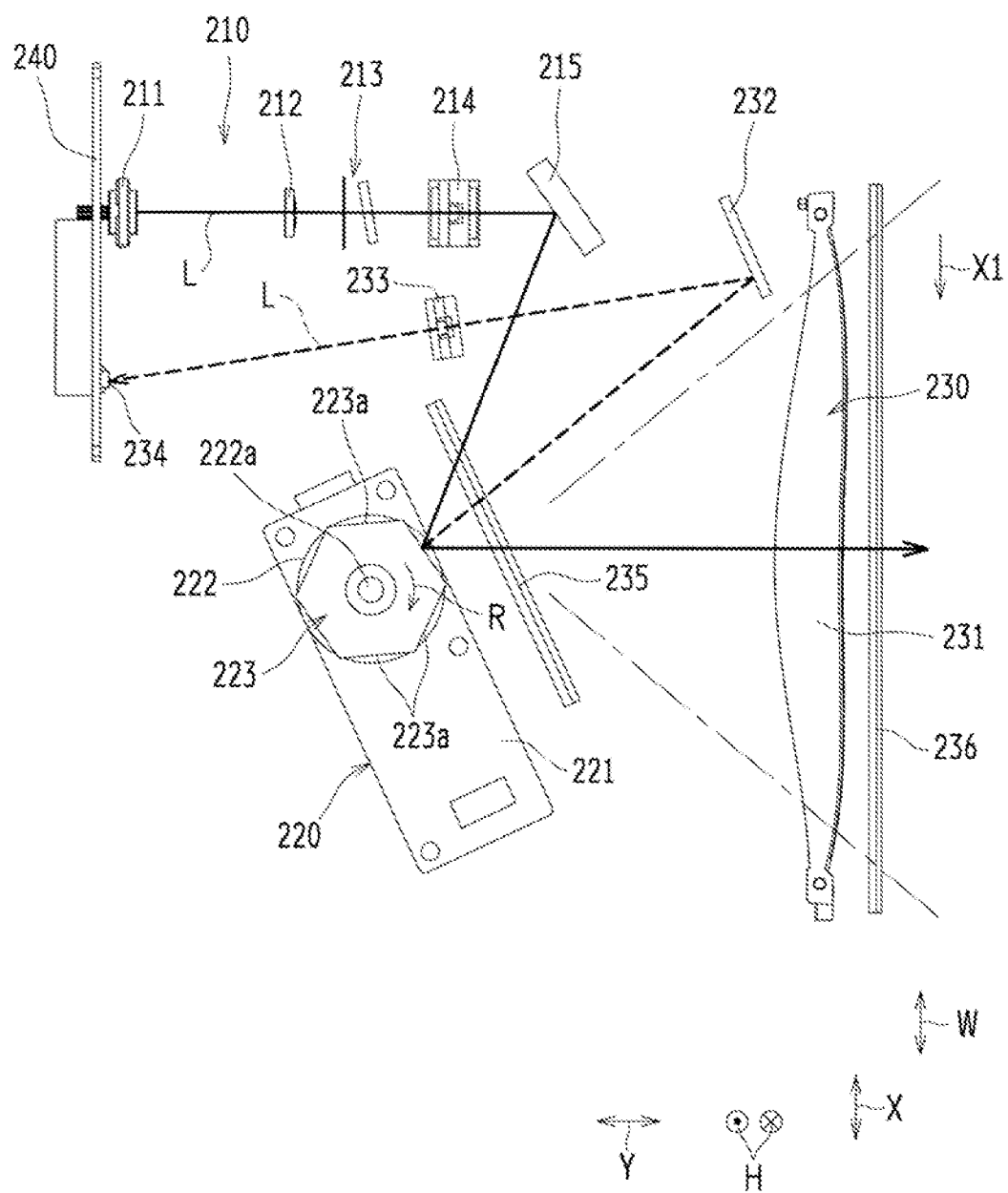
FIG. 5 is a plan view illustrating an example of a configuration of an optical system in the optical scanning device.

FIG. 2 is a perspective view obtained when the optical scanning device 200 in the image forming apparatus 100 illustrated in FIG. 1 is viewed from an upper right on a front side. FIG. 3 is a perspective view obtained when a state where an upper lid 202 of the optical scanning device 200 is removed is viewed from an upper left on the front side. FIG. 4 is a plan view illustrating the optical scanning device 200 illustrated in FIG. 3. FIG. 5 is a plan view illustrating an example of a configuration of an optical system in the optical scanning device 200.

The optical scanning device 200 includes a housing 201, an incident optical system 210, a deflecting and scanning unit 220 (deflecting and scanning portion), and an emission optical system 230.

The incident optical system 210 includes a light source 211 (laser diode element), a collimator lens 212, an aperture member 213, a cylindrical lens 214, and a light source-use reflection mirror 215. The light source 211 emits a light beam L (laser beam). The collimator lens 212 brings the light beam L from the light source 211 into substantially parallel light, and irradiates the aperture member 213 with the substantially parallel light. The aperture member 213 narrows the light beam L from the collimator lens 212 and irradiates the cylindrical lens 214 with the narrowed light beam L. The cylindrical lens 214 converges the light beam L from the aperture member 213 only in the sub scanning direction and collects the converged light beam L onto a reflection surface 223a of a deflecting and scanning member 223 [rotating polygon mirror (polygon mirror)] via the light source-use reflection mirror 215. The cylindrical lens 214 is an example of a lens member including a lens 214a having a lens effect in one direction H. The lens 214a has no lens effect in any direction other than the one direction H. The light source-use reflection mirror 215 guides the light beam L from the cylindrical lens 214 to the reflection surface 223a of the deflecting and scanning member 223.

The deflecting and scanning unit 220 includes a deflecting and scanning substrate 221, a deflecting and scanning motor 222 (polygon motor), and the deflecting and scanning member 223. The deflecting and scanning motor 222 is provided on the deflecting and scanning substrate 221. The deflecting and scanning member 223 is fixed to a rotation shaft 222a of the deflecting and scanning motor 222. The deflecting and scanning member 223 deflects the light beam L from the light source-use reflection mirror 215 in a predetermined main scanning direction X1 to scan in the predetermined main scanning direction X1.

The emission optical system 230 includes an fθ lens 231, a beam detection-use reflection mirror 232, a beam detection-use lens 233 (condensing lens), and a beam detector 234 [Beam Detect sensor (BD sensor)].

The fθ lens 231 has a shape longer in the main scanning direction X1. The fθ lens 231 receives the light beam L deflected in the main scanning direction X1 (longitudinal direction W) by the deflecting and scanning member 223 to scan in the main scanning direction X1. The beam detection-use reflection mirror 232 guides, to the beam detection-use lens 233, the light beam L deflected by the reflection surface 223a of the deflecting and scanning member 223 to scan. At a timing before a main scan is started, the beam detector 234 receives the light beam L and outputs a beam detection signal (BD signal) indicating a timing before the start of the main scan, to take the main scan start timing (image writing start timing) of the optical beam L.

The housing 201 includes a rectangular bottom plate 201a and four side plates 201b to 201e surrounding the bottom plate 201a. The housing 201 is provided with a deflecting and scanning chamber 203 (see FIGS. 3 and 4) covering the deflecting and scanning unit 220. The deflecting and scanning unit 220 is housed in the deflecting and scanning chamber 203.

The light beam L reflected by the light source-use reflection mirror 215 is incident on an inside of the deflecting and scanning chamber 203 through a first window 203b (see FIG. 4) formed on the deflecting and scanning chamber 203. Further, the light beam L deflected by the deflecting and scanning member 223 to scan is emitted to outside of the deflecting and scanning chamber 203 through the first window 203b. A first dustproof glass plate 235 (transparent body) is provided in the first window 203b. Further, the light beam L passing through the fθ lens 231 is emitted to outside of the housing 201 through a second window 201f formed on the side plate 201e on the fθ lens 231 side of the housing 201. A second dustproof glass plate 236 (transparent body) is provided in the second window 201f.

The optical scanning device 200 further includes a substrate 240 (a substrate for a light source and a beam detector). The light source 211 and the beam detector 234 are provided on the substrate 240. The substrate 240 is a flat-plate printed circuit board and includes a circuit that drives the light source 211. The substrate 240 is fixed to outside of the side plate 201d of the housing 201 on an opposite side of the fθ lens 231 so that an emitter of the light source 211 and a light receiver of the beam detector 234 face inside the housing 201. The emitter of the light source 211 and the light receiver of the beam detector 234 face the inside of the housing 201 through respective openings (not illustrated) formed in the side plate 201d. This allows the light source 211 to emit the light beam L from the emitter toward the collimator lens 212 in the housing 201. The beam detector 234 receives, by the light receiver, the light beam L passing through the beam detection-use lens 233 from the beam detection-use reflection mirror 232 in the housing 201.

Further, the deflecting and scanning substrate 221 is a flat plate-shaped printed circuit board and includes a circuit for driving the deflecting and scanning motor 222. The deflecting and scanning motor 222 is fixed on the deflecting and scanning substrate 221, and a center of the deflecting and scanning member 223 is connected and fixed to the rotation shaft 222a of the deflecting and scanning motor 222. The deflecting and scanning member 223 is rotationally driven by the deflecting and scanning motor 222.

Next, an optical path where the light beam L from the light source 211 enters the photoconductive drum 3 will be described.

The light beam L from the light source 211 transmits through the collimator lens 212 to provide substantially parallel light, is narrowed by the aperture member 213, transmits through the cylindrical lens 214, is reflected after being incident on the light source-use reflection mirror 215, and is incident on the reflection surface 223a of the deflecting and scanning member 223. The deflecting and scanning member 223 is rotated in a predetermined rotation direction R (see FIG. 5) at an constant angular velocity by the deflecting and scanning motor 222, sequentially reflects the light beam L by each reflection surface 223a, and repeatedly deflects the light beam L at an constant angular velocity into the main scanning direction X1. The fθ lens 231 collects the light beam L on a surface of the photoconductive drum 3, in both the main scanning direction X1 and the sub scanning direction, so that the light beam L has a predetermined beam diameter. Further, the fθ lens 231 converts the light beam L deflected by the deflecting and scanning member 223 in the main scanning direction X1 at an constant angular velocity so that the light beam L moves at a constant liner velocity on the photoconductive drum 3. This allows the light beam L to repeatedly scan the surface of the photoconductive drum 3 in the main scanning direction X1.

Further, the optical scanning device 200 detects, by the beam detector 234, the main scan start timing of the light beam L emitted from the light source 211 and deflected by the deflecting and scanning member 223 to scan in the main scanning direction X1. The beam detector 234 receives the light beam L reflected by the beam detection-use reflection mirror 232 immediately before the main scan (writing) of the photoconductive drum 3 is started. The beam detector 234 receives the light beam L at a timing immediately before the main scanning on the surface of the photoconductive drum 3 is started, and outputs a BD signal indicating the timing immediately before the start of the main scanning. The start timing of the main scan of the photoconductive drum 3 on which a toner image is formed is set according to the BD signal, and the writing of the light beam L according to image data is started. Thereafter, a two-dimensional surface (peripheral surface) of the photoconductive drum 3 rotationally driven and charged is scanned by the light beam L, and thus, electrostatic latent images are each formed on the surface of the photoconductive drum 3.

Present Embodiment

Next, a configuration of the optical scanning device 200 according to the present embodiment will be described below with reference to FIGS. 6A to 11 by using the cylindrical lens 214 as an example of the lens member.

First Embodiment

Figure 6A:
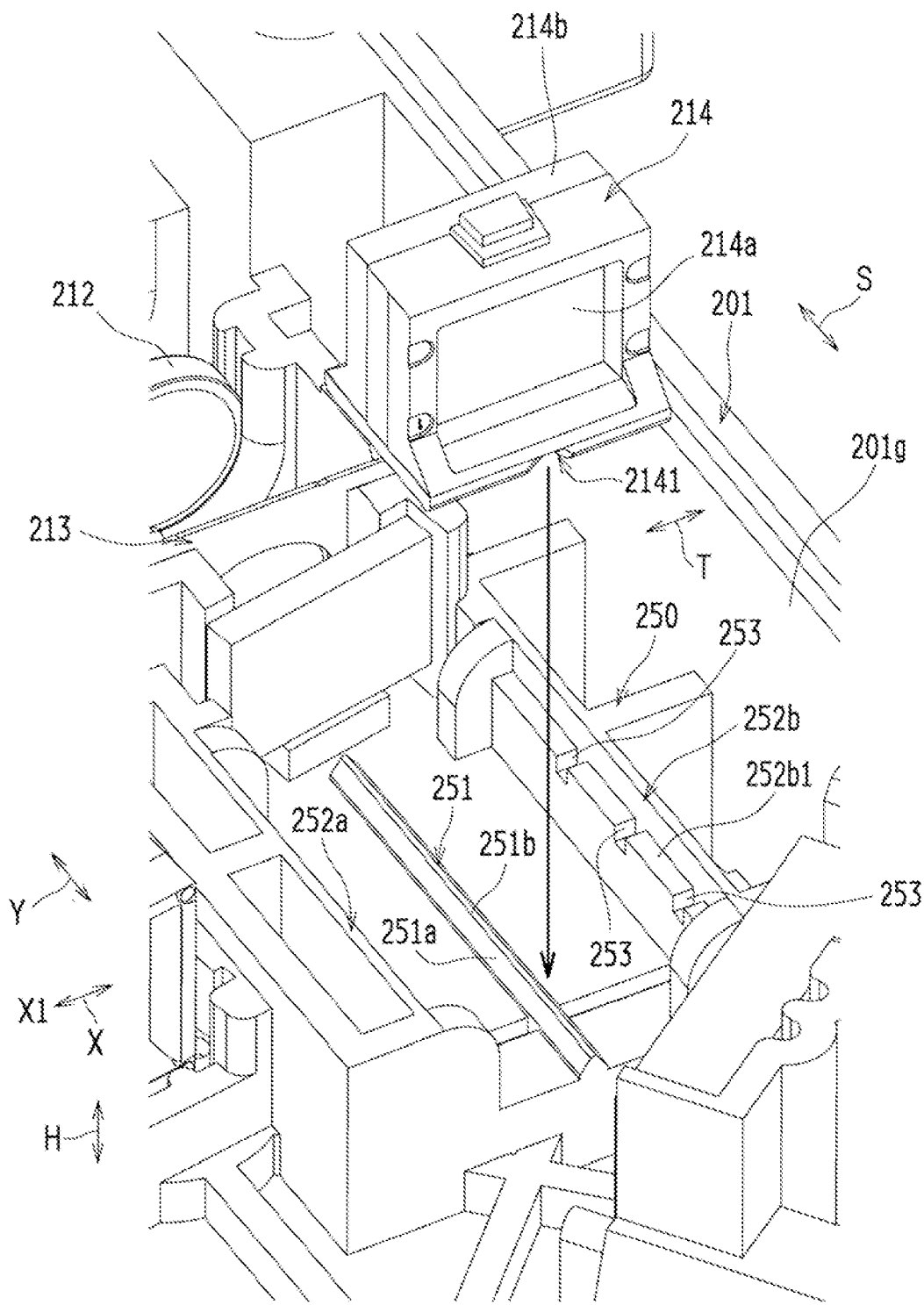
FIG. 6A is a perspective view obtained when a state before a lens member is installed in a support of a housing in the optical scanning device is viewed from diagonally above on an emission side of the light beam.
Figure 6B:
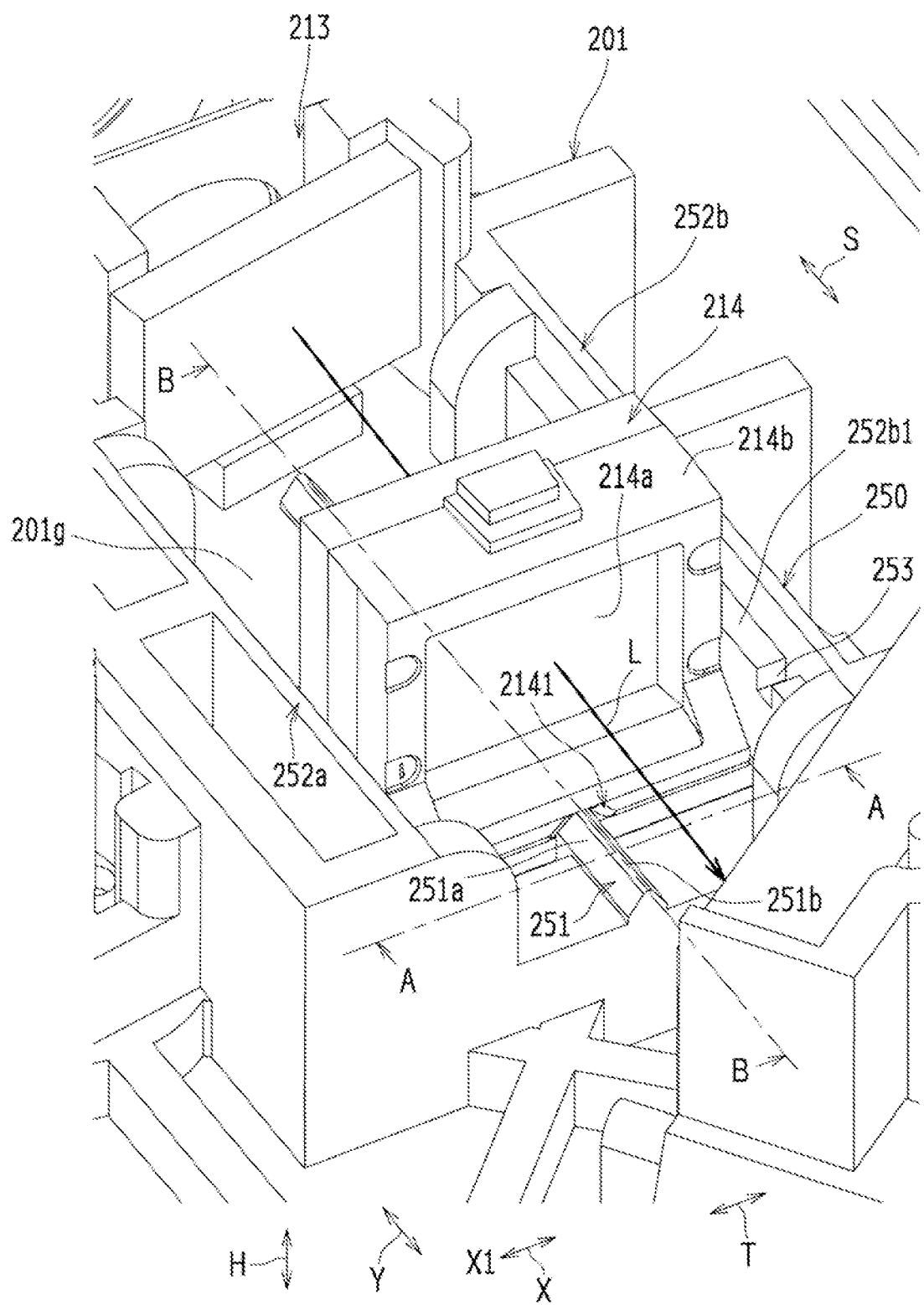
FIG. 6B is a perspective view obtained when a state where the lens member is installed in the support of the housing is viewed from diagonally above on the emission side of the light beam.
Figure 6C:
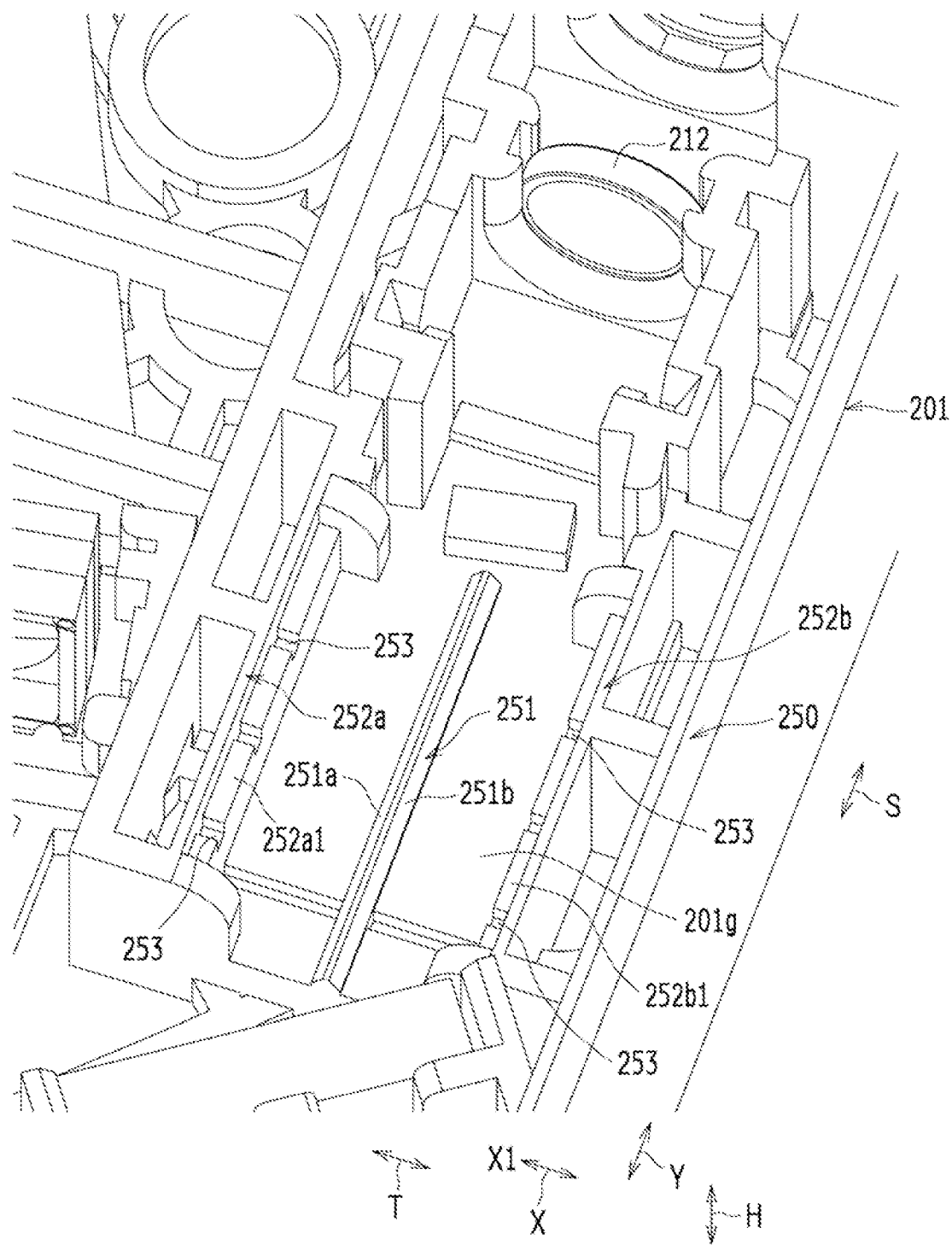
FIG. 6C is a perspective view obtained when the support of the housing is viewed from diagonally above on the emission side of the light beam.
Figure 7A:
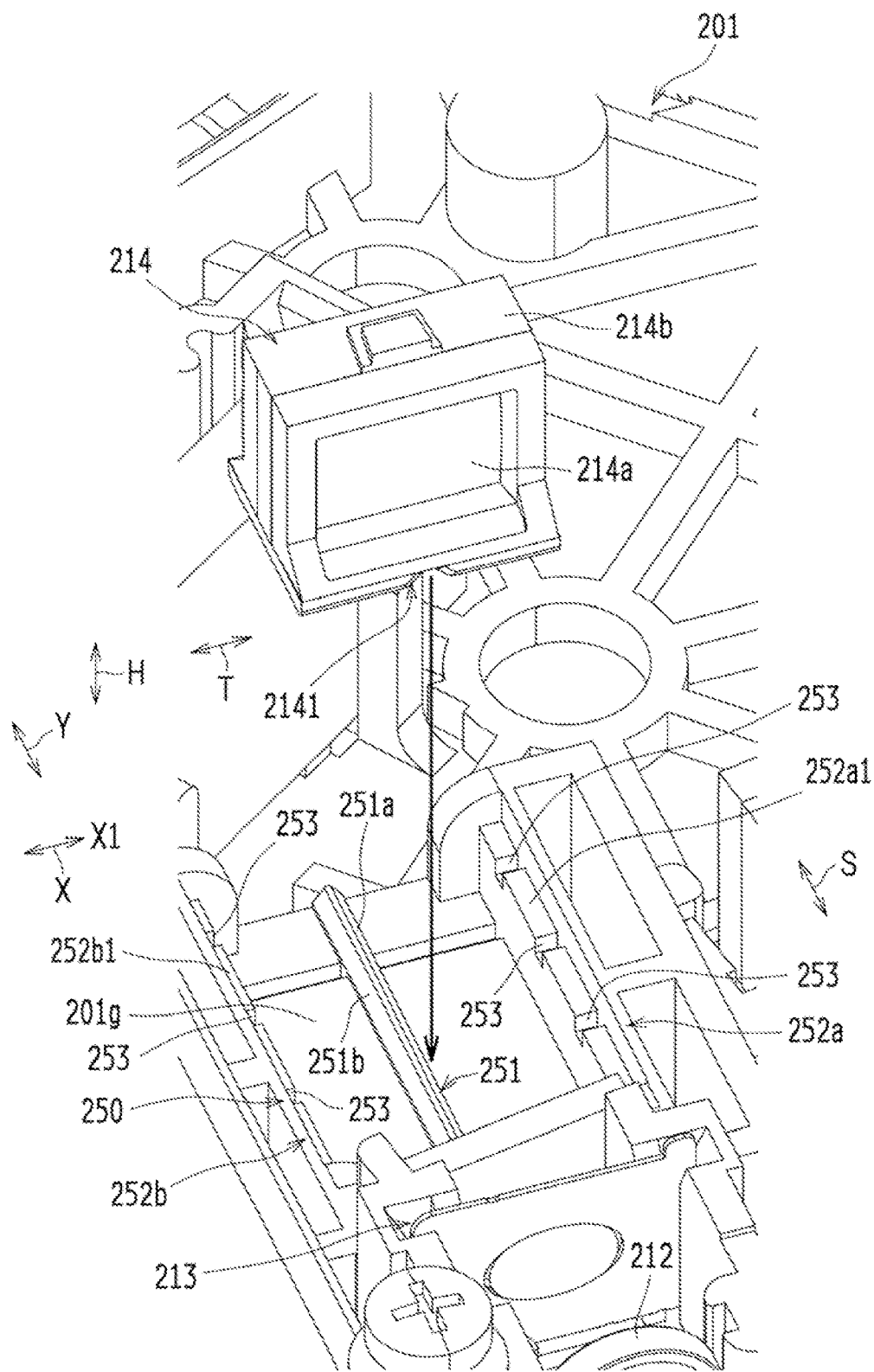
FIG. 7A is a perspective view obtained when a state before the lens member is installed in the support of the housing in the optical scanning device is viewed from diagonally above on an incident side of the light beam.
Figure 7B:
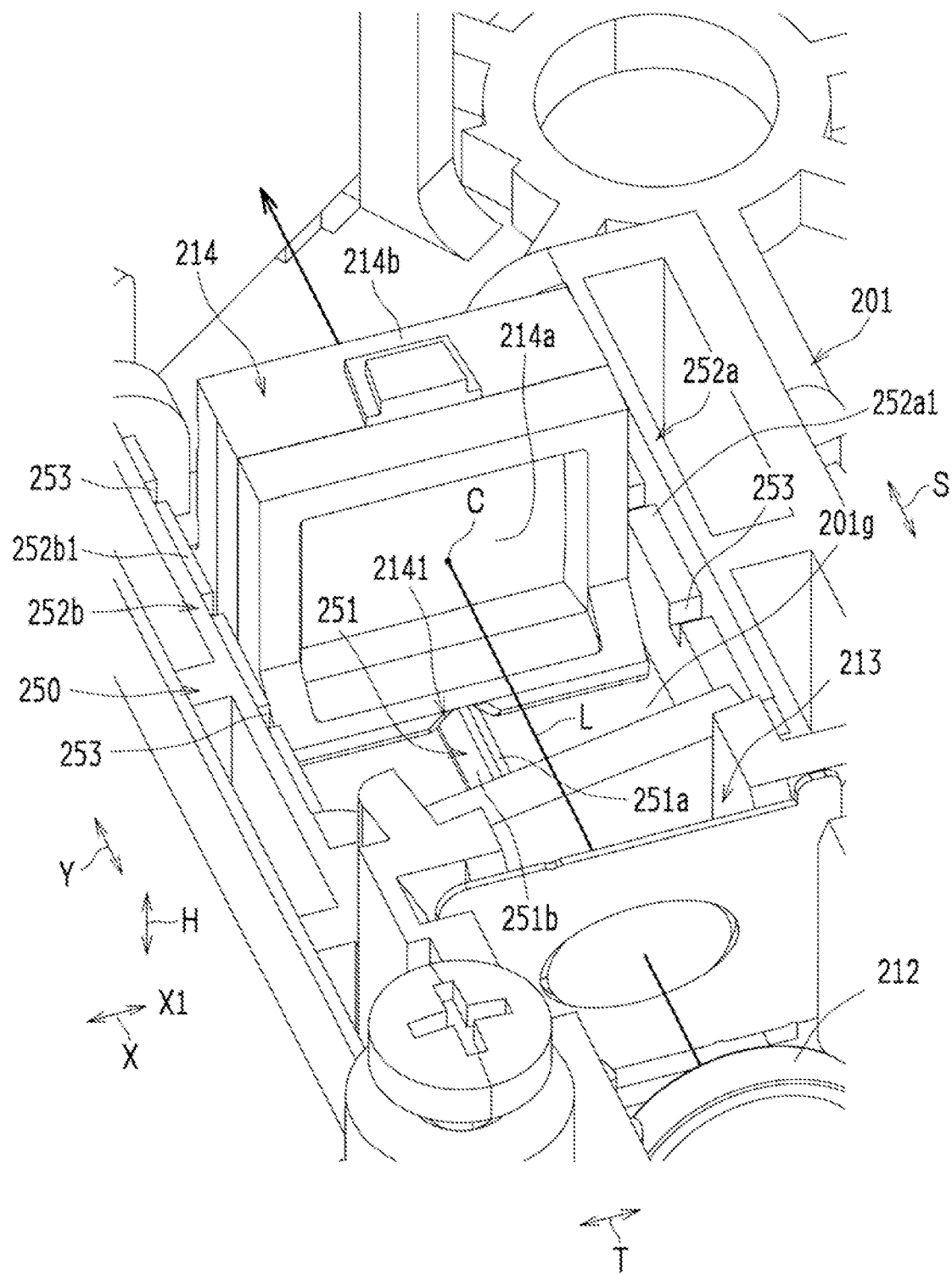
FIG. 7B is a perspective view obtained when a state where the lens member is installed in the support of the housing is viewed from diagonally above on the incident side of the light beam.
Figure 7C:
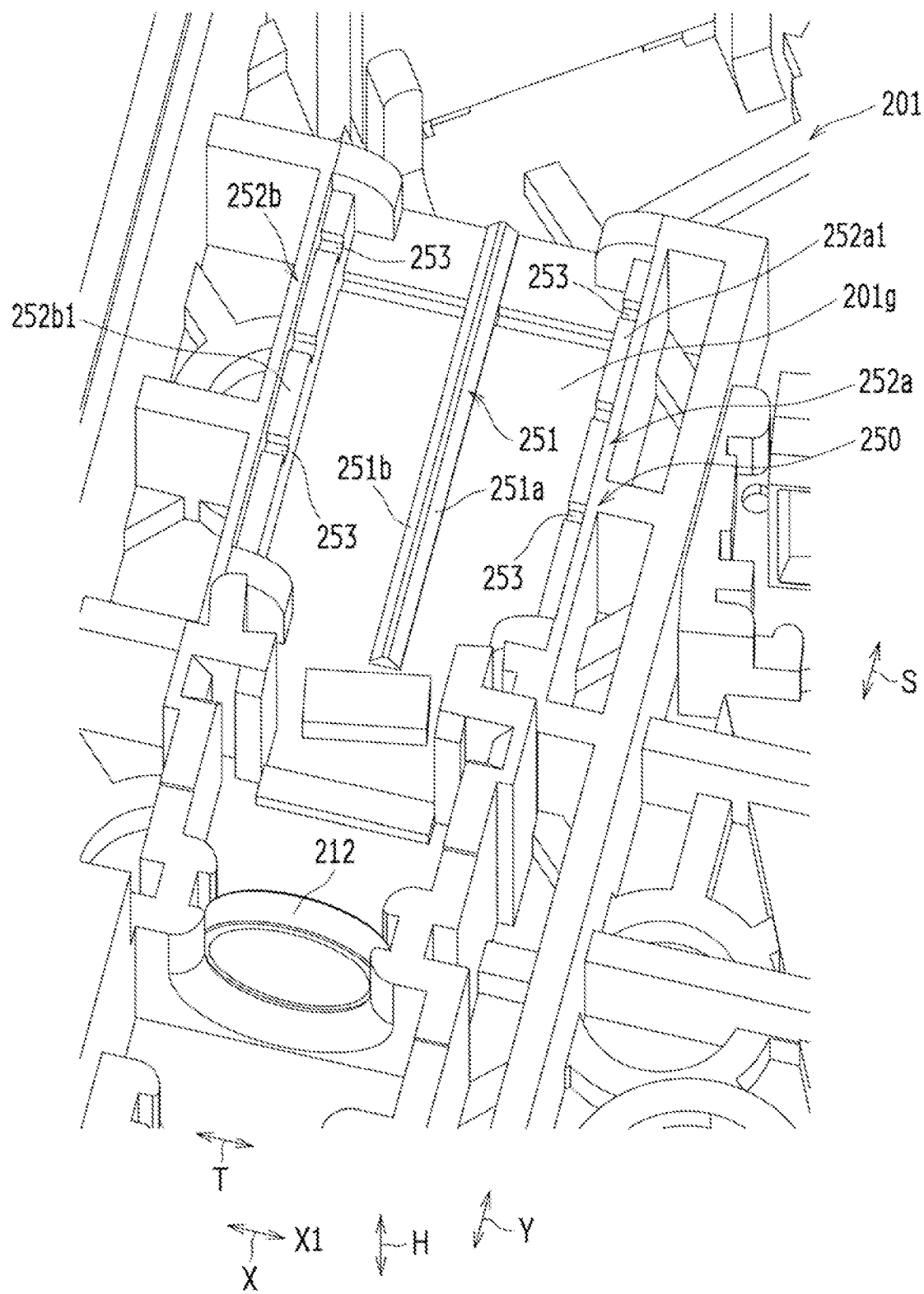
FIG. 7C is a perspective view obtained when the support of the housing is viewed from diagonally above on the incident side of the light beam.

FIG. 6A is a perspective view obtained when a state before the lens member (214) is installed in a support 250 of the housing 201 in the optical scanning device 200 is viewed from diagonally above on an emission side of the light beam L. FIG. 6B is a perspective view obtained when a state where the lens member (214) is installed in the support 250 of the housing 201 is viewed from diagonally above on the emission side of the light beam L. FIG. 6C is a perspective view obtained when the support 250 of the housing 201 is viewed from diagonally above on the emission side of the light beam L. It is noted that the aperture member 213 and the like are not illustrated in FIG. 6C. FIG. 7A is a perspective view obtained when a state before the lens member (214) is installed in the support 250 of the housing 201 in the optical scanning device 200 is viewed from diagonally above on an incident side of the light beam L. FIG. 7B is a perspective view obtained when a state where the lens member (214) is installed in the support 250 of the housing 201 is viewed from diagonally above on the incident side of the light beam L. FIG. 7C is a perspective view obtained when the support 250 of the housing 201 is viewed from diagonally above on the incident side of the light beam L. It is noted that the aperture member 213 and the like are not illustrated in FIG. 7C.

Figure 8A:
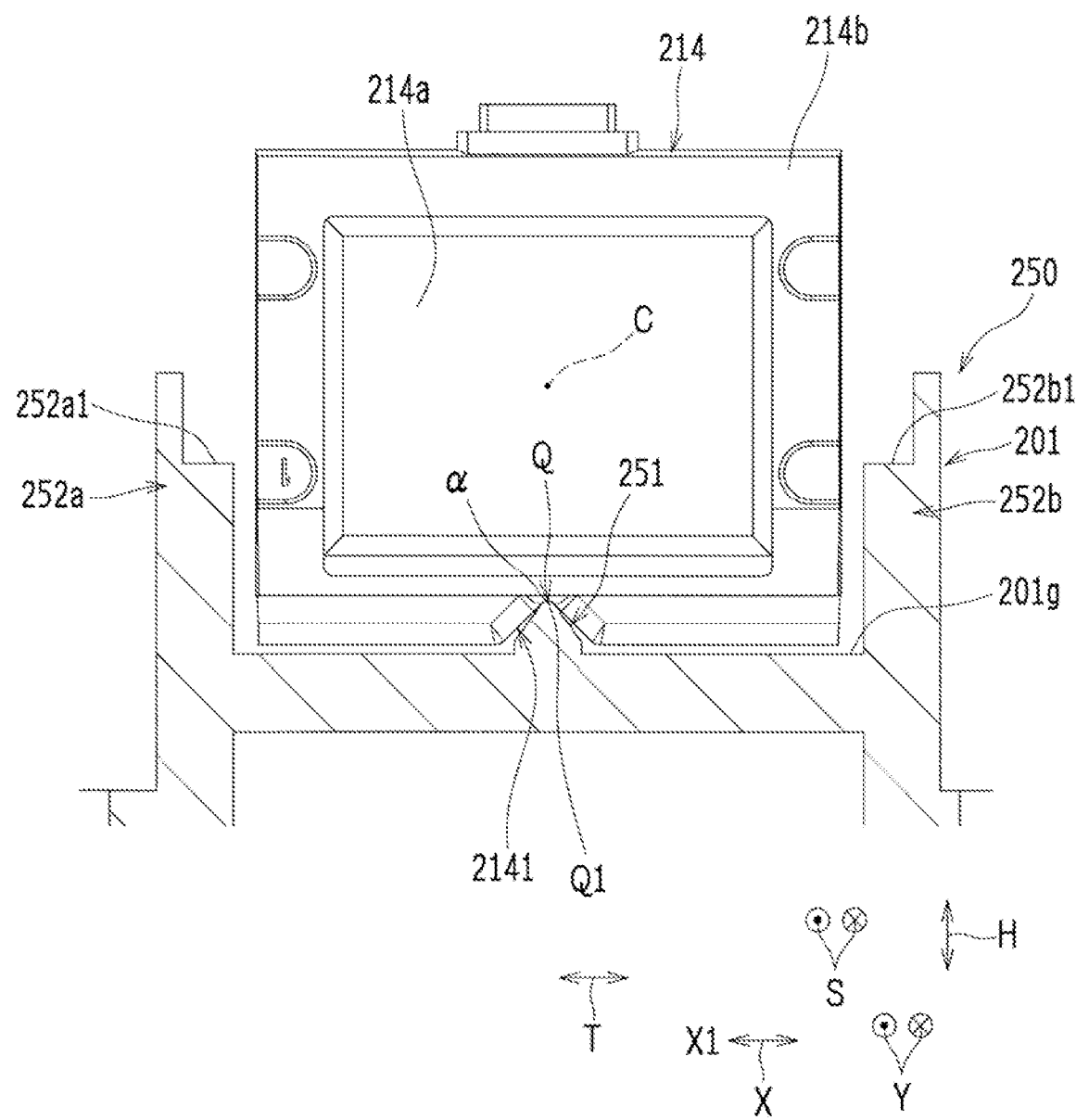
FIG. 8A is a cross-sectional view taken along a line A-A illustrated in FIG. 6B.
Figure 8B:
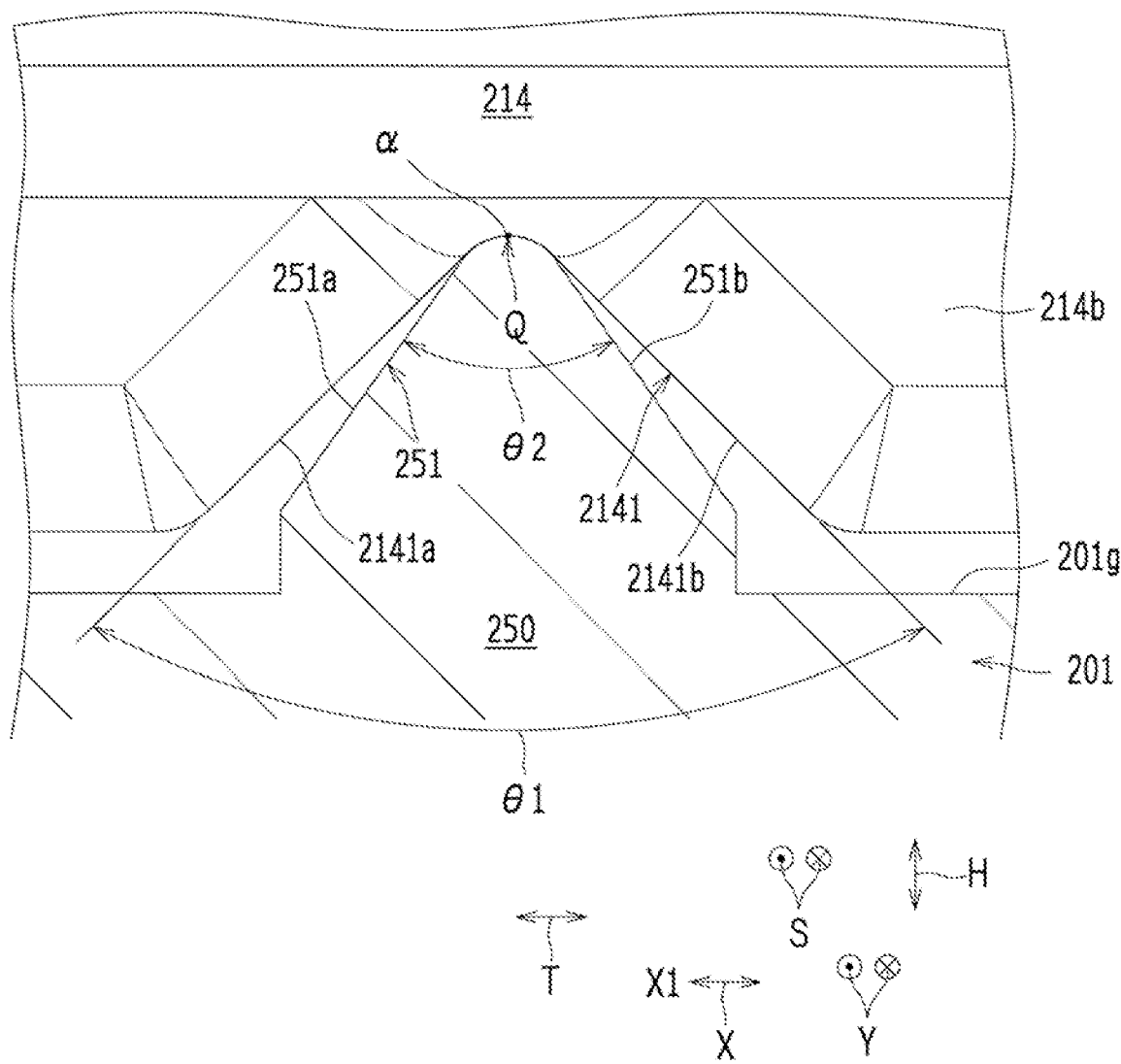
FIG. 8B is an enlarged cross-sectional view illustrating a portion including a lens member-side engagement and a housing-side engagement illustrated in FIG. 8A.
Figure 9:
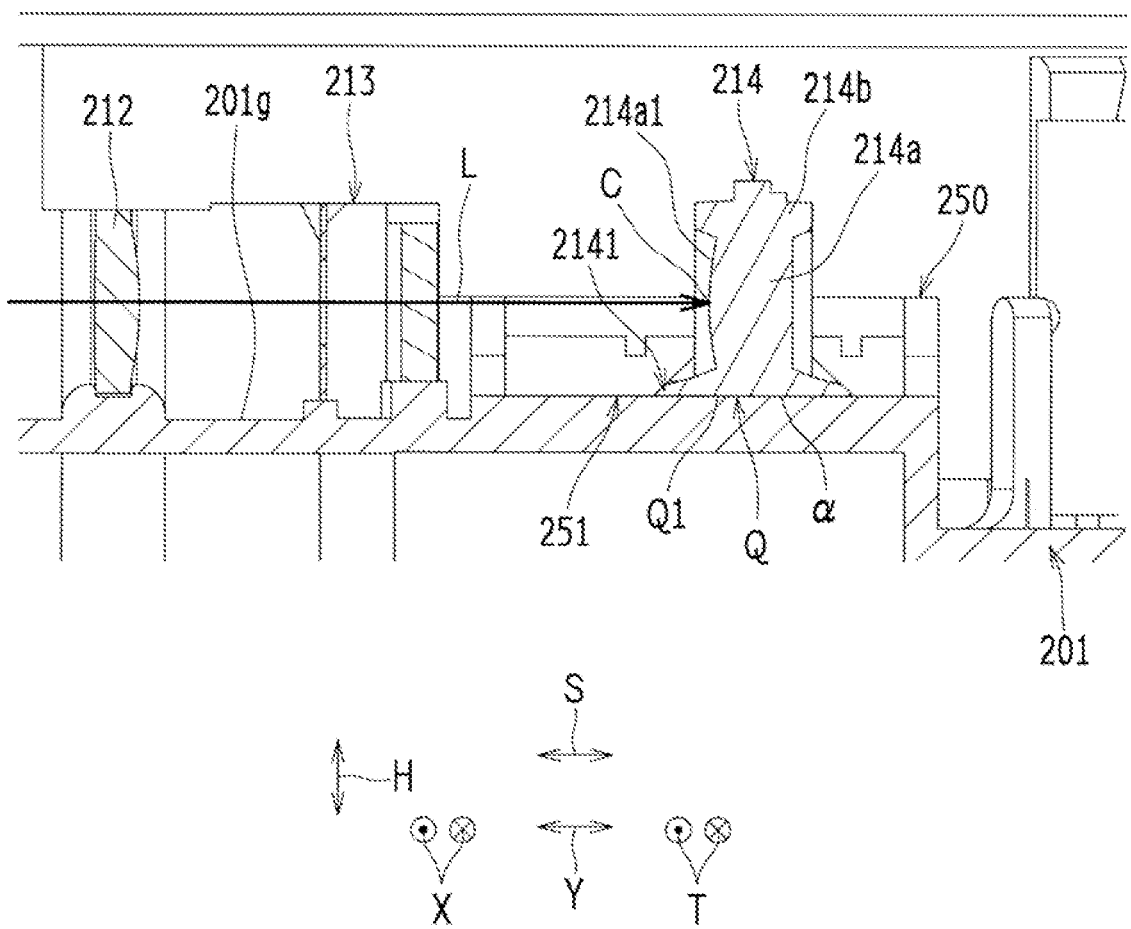
FIG. 9 is a cross-sectional view taken along a line B-B illustrated in FIG. 6B.
Figure 10A:
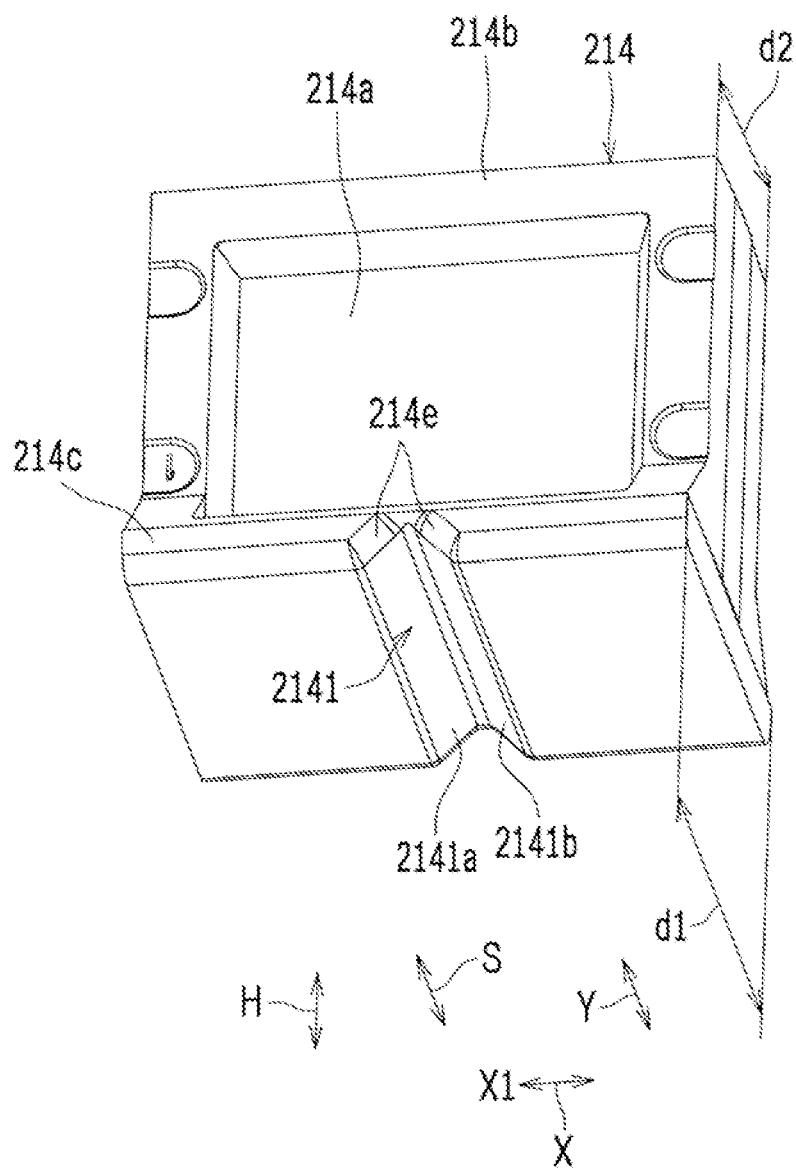
FIG. 10A is a perspective view obtained when the lens member is viewed from below on the emission side of the light beam.
Figure 10B:
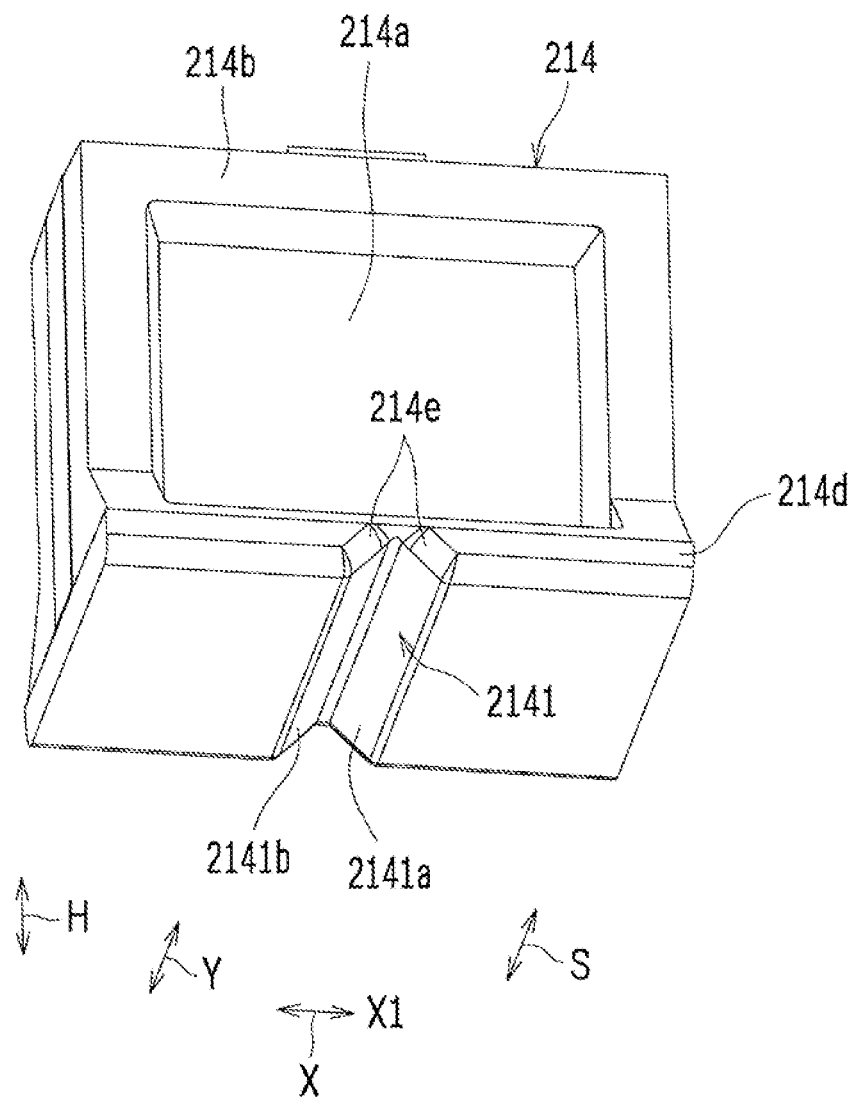
FIG. 10B is a perspective view obtained when the lens member is viewed from below on the incident side of the light beam.
Figure 11:
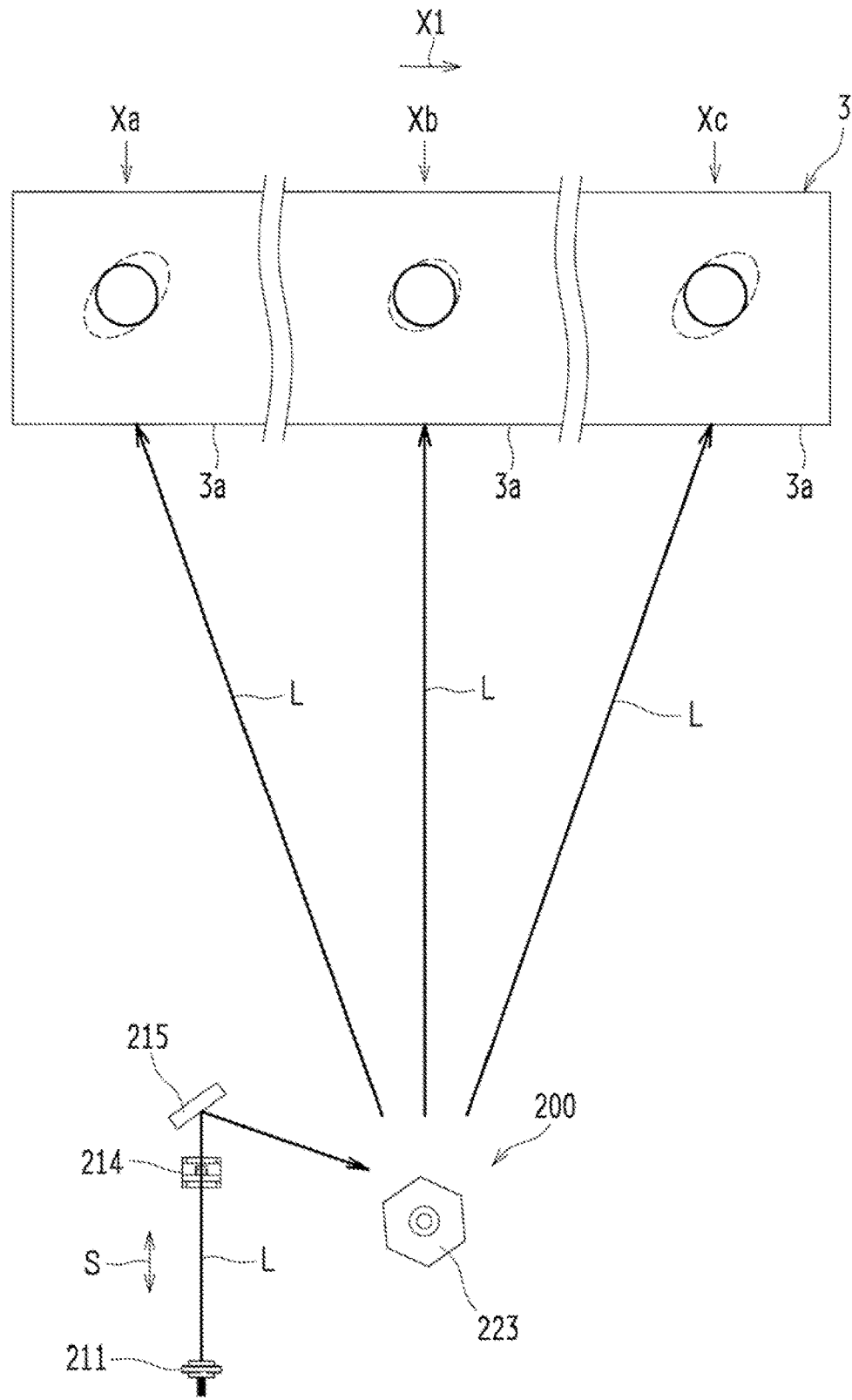
FIG. 11 is a schematic diagram illustrating cross sectional shapes of the light beam at an end on a writing start side in a main scanning direction, at a center therein, and at an end on a writing end side therein, in a state where a light beam emitted from an optical scanning device with a lens member being adjusted around an axis along an optical axis direction enters, with irradiation, an image surface of a photoconductive drum.

FIG. 8A is a cross-sectional view taken along a line A-A illustrated in FIG. 6B. FIG. 8B is an enlarged cross-sectional view illustrating a portion including a lens member-side engagement 2141 and a housing-side engagement 251 illustrated in FIG. 8A. FIG. 9 is a cross-sectional view taken along a line B-B illustrated in FIG. 6B. FIG. 10A is a perspective view obtained when the lens member (214) is viewed from below on the emission side of the light beam L. FIG. 10B is a perspective view obtained when the lens member (214) is viewed from below on the incident side of the light beam L. Further, FIG. 11 is a schematic diagram illustrating cross sectional shapes of the light beam L at an end Xa on a writing start side in the main scanning direction X1, at a center Xb therein, and at an end Xc on a writing end side therein, in a state where the light beam L emitted from the optical scanning device 200 with the lens member (214) being adjusted around an axis α running along an optical axis direction S enters, with irradiation, an image surface 3a of the photoconductive drum 3.

The housing 201 includes the support 250 that supports the lens member (cylindrical lens 214) so that the light beam L passes through the lens 214a. The lens 214a collects light (has a curvature) only in the one direction H (a rotation axis direction of the deflecting and scanning member 223 or a height direction). The lens 214a includes a curve 214a1 (see FIG. 9) convexly curved with a predetermined radius of curvature on the incident side of the light beam L. The housing 201 is formed of a black resin material. Examples of the material used for the lens member (214) include a glass material and a transparent material such as a transparent resin material including, but not limited to, acrylic resin and polycarbonate.

The housing 201 and the lens member (214) are provided with the housing-side engagement 251 and the lens member-side engagement 2141 respectively that engage with each other. The housing-side engagement 251 and the lens member-side engagement 2141 are capable of pivoting the lens member (214) around the axis α (see FIGS. 8A, 8B, and 9) running along the optical axis direction S of the light beam L passing through a contact Q (see FIGS. 8A and 8B) contacted through concavo-convex engagement with each other.

According to the present embodiment, the housing-side engagement 251 and the lens member-side engagement 2141, which are capable of pivoting the lens member (cylindrical lens 214) around the axis α running along the optical axis direction S of the light beam L passing through the contact Q contacted through concavo-convex engagement with each other, are capable of pivoting and adjusting the lens member (214) from an inclined position to a normal position. This effectively prevents the inconvenience caused by the inclination, around the axis α along the optical axis direction S of the light beam L, of the lens member (214) including the lens 214a having a lens effect in the one direction H. For example, if the lens member is the cylindrical lens 214 as in the present embodiment, as illustrated in FIG. 11, in a state where the light beam L emitted from the optical scanning device 200 enters, with irradiation, the image surface 3a of the photoconductive drum 3 (object to be scanned), a cross-sectional shape (dot shape) of the light beam L is allowed to take a form of a circular shape at any of the end Xa on the writing start side in the main scanning direction X1, at the center Xb therein, and at the end Xc on the writing end side therein. This is particularly effective at the ends Xa and Xc on both sides in the main scanning direction X1. This improves a resolution of an image formed on the paper P, and in addition, allows the toner to surely adhere to the latent image, and thus, it is possible to eliminate the inconvenience that the image is blurred at the ends Xa and Xc on both the sides in the main scanning direction X1. Further, the lens member may be the beam detection-use lens 233. In this case, it is possible to improve a detection accuracy of the beam detector 234. As described above, the lens member may be provided in the emission optical system 230 downstream of the deflecting and scanning member 223 in a traveling direction of the light beam L; however, in the incident optical system 210 upstream of the deflecting and scanning member 223 in the traveling direction of the light beam L, an adjustment accuracy of an optical member is often demanded. Therefore, such an arrangement is not limiting, and it is possible to effectively provide the lens member in the incident optical system 210

In the present embodiment, the housing-side engagement 251 and the lens member-side engagement 2141 are capable of moving the lens member (214) in the optical axis direction S. Thus, it is possible to move and adjust the lens member (214) in the optical axis direction S along the housing-side engagement 251, so that a focal point or other magnifications of the lens member (214) can be adjusted.

In the present embodiment, the lens member-side engagement 2141 is a recess and the housing-side engagement 251 is a protrusion. Thus, even if the lens member (214) provided with the lens member-side engagement 2141 being a recess is used for another model of optical scanning device, it is possible to install the lens member (214) provided with the lens member-side engagement 2141 being a recess, into the flat-surface housing, and as a result, it is possible to use the lens member (214) according to the present embodiment for a lens of another model of the optical scanning device.

In the present embodiment, the recess and the protrusion extend in the optical axis direction. Thus, it is possible to configure that the lens member (214) is less likely to fall in the optical axis direction S, and as a result, it is possible to stably adjust the lens member (214). Further, it is possible to surely move the lens member-side engagement 2141 in the optical axis direction S with respect to the housing-side engagement 251, and as a result, it is possible to stably adjust the lens member (214) in the optical axis direction S.

In the present embodiment, the lens member (214) includes a frame body 214b that surrounds the lens 214a. The lens member-side engagement 2141 is provided on a bottom surface of the frame body 214b. As a result, it is possible to provide the lens member-side engagement 2141 onto the lens member (214) without interfering with the lens 214a.

In the present embodiment, a length d1 (see FIG. 10A) of the bottom surface of the frame body 214b in the optical axis direction S is longer than a length d2 (see FIG. 10A) of a top surface of the frame body 214b in the optical axis direction S. Thus, it is possible to configure that the lens member (214) is further less likely to fall in the optical axis direction S, and as a result, it is possible to more stably adjust the lens member (214). Further, it is possible to more surely move the lens member-side engagement 2141 in the optical axis direction S with respect to the housing-side engagement 251, and as a result, it is possible to more stably adjust the lens member (214) in the optical axis direction S.

In the present embodiment, the housing-side engagement 251 is provided on a bottom surface 201g of the housing 201. The recess includes a pair of recess-side inclinations 2141a and 2141b (see FIGS. 8B, 10A, and 10B, in this example) inclined to spread to both sides gradually toward a protrusion side engaged in an orthogonal direction orthogonal to the optical axis direction S (in a width direction T orthogonal both to the one direction H and the optical axis direction S, in this example). The protrusion includes a pair of protrusion-side inclinations 251a and 251b inclined to be narrowed from both the sides gradually toward the recess side engaged in the width direction T. Thus, it is possible to guide an apex of the protrusion to a bottom of the recess to easily insert the protrusion into the recess allowing the protrusion and the recess to be engaged with each other at the contact Q.

In the present embodiment, a first inclination angle θ1 (see FIG. 8B) formed by the pair of recess-side inclinations 2141a and 2141b is larger than a second inclination angle θ2 (see FIG. 8B) formed by the pair of protrusion-side inclinations 251a and 251b. Thus, it is possible to secure a pivot adjustment range around the axis α of the lens member (214), and as a result, it is possible to surely pivot and adjust the lens member (214) around the axis α.

In the present embodiment, an intersection of the pair of recess-side inclinations 2141a and 2141b and an intersection of the pair of protrusion-side inclinations 251a and 251b are both curved surface shapes. If R1 denotes a radius of curvature of the intersection of the pair of recess-side inclinations 2141a and 2141b and R2 denotes a radius of curvature of the intersection of the pair of protrusion-side inclinations 251a and 251b, a relationship of R1>R2 is satisfied. Thus, the intersection of the pair of recess-side inclinations 2141a and 2141b and the intersection of the pair of protrusion-side inclinations 251a and 251b are smoothly engaged with each other at the contact Q, and thus, it is possible to easily pivot and adjust the lens member (214) around the axis α.

If the lens member-side engagement 2141 is a recess and the housing-side engagement 251 is a protrusion as in the present embodiment, corners 214e to 214e (see FIG. 10A and FIG. 10B) between an incident side surface 214c (see FIG. 10A) of the lens member (214) on which the light beam L is incident and an emission side surface 214d (see FIG. 10B) of the lens member (214) from which the light beam L emits, and the pair of recess-side inclinations 2141a and 2141b are preferably curved surface shapes. Thus, when the lens member (214) is installed in the housing 201, even if the lens member (214) is tilted in the optical axis direction S, it is possible to surely guide the apex of the protrusion to the bottom of the recess to easily insert the protrusion into the recess allowing the protrusion and the recess to be smoothly engaged at the contact Q.

In the present embodiment, in the width direction T orthogonal both to the one direction H and the optical axis direction S, a center Q1 of the contact Q (see FIGS. 8A and 9) is aligned with a center C of the curved surface configuring the lens 214a of the lens member (214) (see FIGS. 7, 8A, and 9). Thus, when the lens member (214) is pivoted around the center Q1 of the contact Q, the center Q1 of the curved surface configuring the lens member (214) is easily aligned with a position of the optical axis of the light beam L.

Second Embodiment

In a second embodiment, members having the same configuration and operation as those in the first embodiment are designated by the same reference numerals.

Figure 12:
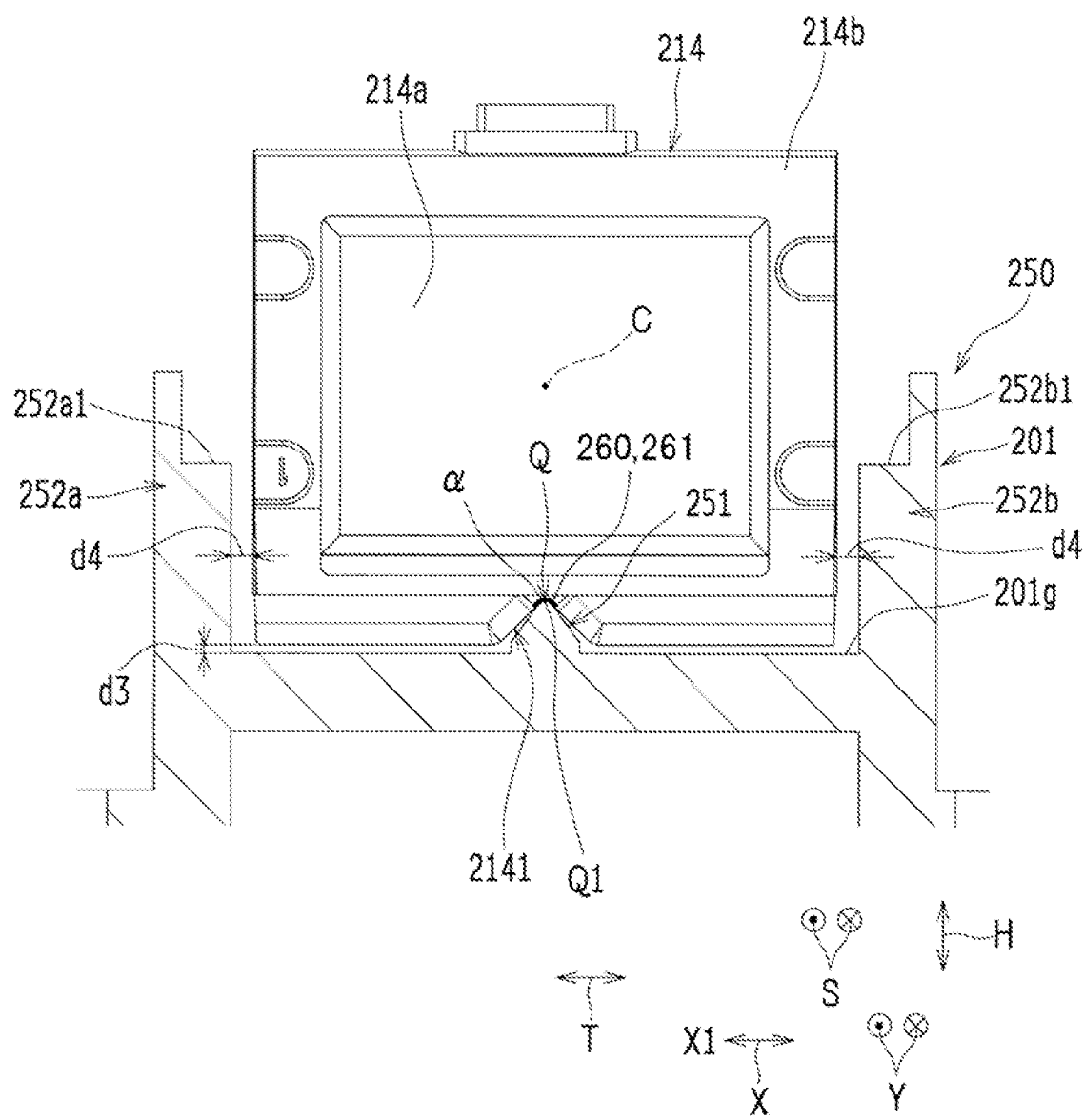
FIG. 12 is a cross-sectional view illustrating an example of a state where the adjusted lens member is fixed to the housing by a fixing member in FIG. 8A.

FIG. 12 is a cross-sectional view illustrating an example of a state where the adjusted lens member (214) is fixed to the housing 201 by a fixing member 260, in FIG. 8A.

In the present embodiment, as illustrated in FIG. 12, the lens member (214) is fixed to the housing 201 by the fixing member 260. Thus, it is possible to surely fix the adjusted lens member (214) to the housing 201 by the fixing member 260.

In the present embodiment, the fixing member 260 is an adhesive 261 (in this example, an ultraviolet-curable adhesive) that bonds the contact Q between the housing-side engagement 251 and the lens member-side engagement 2141 to fix the lens member (214) to the housing 201. Thus, it is possible to install the lens member (214) in the housing 201 after the adhesive 261 is easily applied to the housing-side engagement 251 to adjust the lens member (214), and as a result, it is possible to easily bond and fix the adjusted lens member (214) to the housing 201 with a simple operation. In this example, the adhesive 261 is an ultraviolet-curable adhesive.

Lens Member Adjusting Step

In a lens member adjusting step of adjusting the lens member (214), at a position corresponding to the image surface 3a of the photoconductive drum 3, adjustment cameras are arranged at three locations, the end Xa on a scanning start side in the main scanning direction X1, the center Xb therein, and the end Xc on a scanning end side therein, respectively. The lens member adjusting step includes an adhesive applying step, a first adjusting step, a second adjusting step, and an adhesive curing step. In the adhesive applying step, the adhesive 261 is applied to the housing-side engagement 251. In the first adjusting step, after the adhesive applying step, a position of the lens member (214) in the optical axis direction S is adjusted. At this time, the position of the lens member (214) in the optical axis direction S is adjusted so that a cross-sectional shape of the light beam L is the smallest in images of the adjustment cameras arranged at the three locations. In the second adjusting step, after the first adjusting step, an inclination of the lens member (214) around the axis α is adjusted. At this time, the inclination of the lens member (214) around the axis α is adjusted so that the cross-sectional shape of the light beam L is circular or closest to the circular shape in the images of the adjustment cameras arranged at the three locations. Here, in the first adjusting step and the second adjusting step, when the lens member (214) is moved in the optical axis direction S and the lens member (214) is pivoted around the axis α, a jig that holds the lens member (214), moves the lens member (214) in the optical axis direction S, and pivots the lens member (214) around the axis α, is used. In the adhesive curing step, the adhesive is cured after the second adjusting step. In this example, the adhesive 261 being an ultraviolet-curable adhesive is irradiated with ultraviolet rays. Thus, it is possible to bond and fix the adjusted lens member (214) to the housing 201.

In the present embodiment, the housing 201 is provided with a restrictor (in this example, a bottom surface 201g) that restricts the lens member (214) from pivoting around the axis α. Thus, when the lens member (214) is installed in the housing 201, it is possible to avoid the lens member (in this example, the bottom surface 201g) from pivoting too much around the axis α by the restrictor, and as a result, it is possible to effectively prevent the lens member (214) from tipping over around the axis α.

In this example, the support 250 is provided with a pair of walls 252a and 252b facing both side surfaces of the lens member (214) in the width direction T. The pair of walls 252a and 252b are erected from the bottom surface 201g of the housing 201. If the lens member (214) pivots too much around the axis α, the lens member (214) abuts against the bottom surface 201g before either one of the pair of walls 252a and 252b. A gap d3 between the lens member (214) and the bottom surface 201g is smaller than gaps d4 and d4 between the lens member (214) and the pair of walls 252a and 252b. In this example, the gap d3 (see FIG. 12) is about 0.2 mm, and the gaps d4 and d4 (see FIG. 12) are about 0.6 mm.

It is noted that in this example, the housing-side engagement 251 and the lens member-side engagement 2141 are bonded to each other, but instead thereof or in addition thereto, the lens member (214) and the pair of walls 252a and 252b may be bonded.

Figure 13:
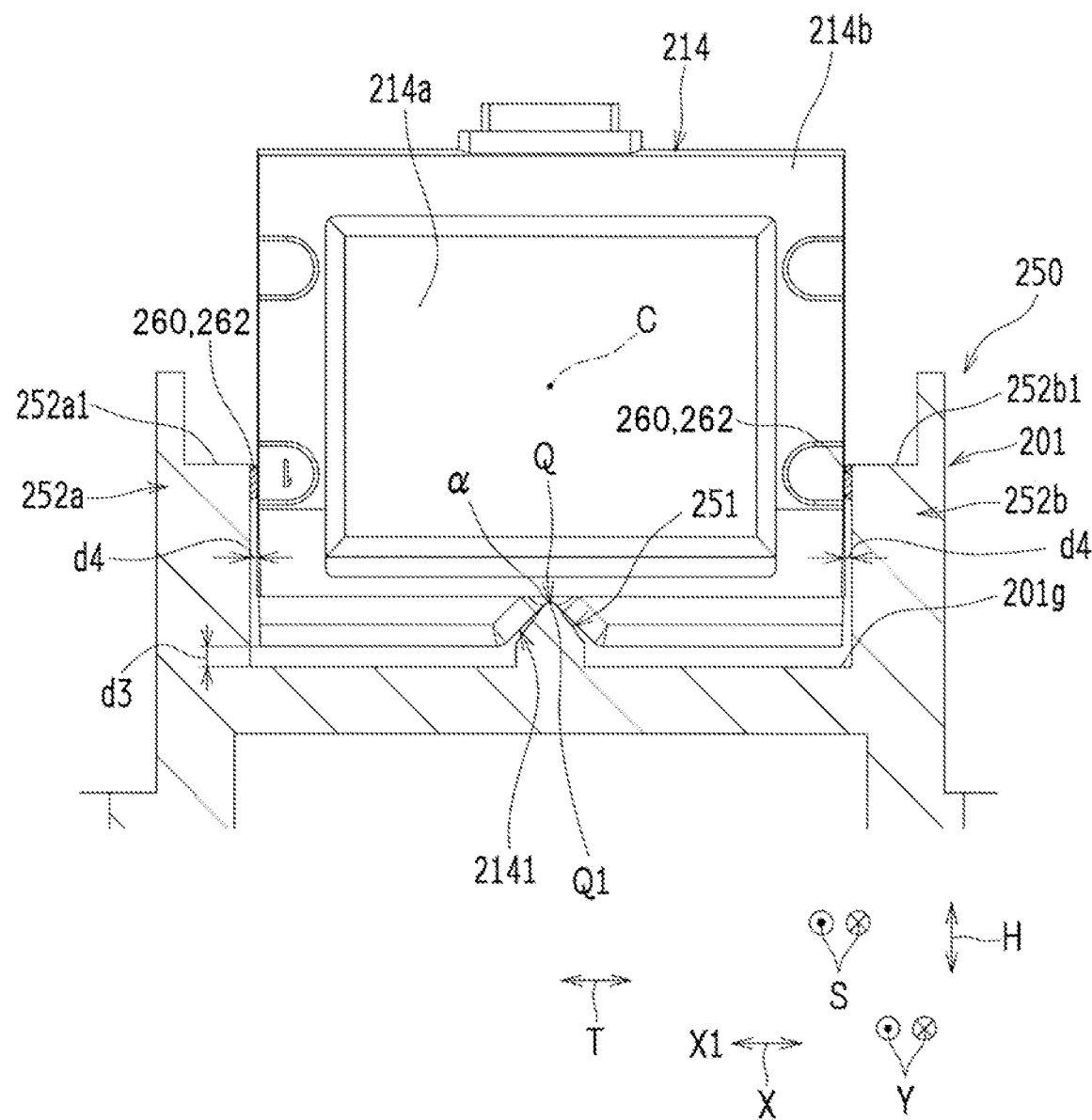
FIG. 13 is a cross-sectional view illustrating another example of a state where the adjusted lens member is fixed to the housing by a fixing member in FIG. 8A.

FIG. 13 is a cross-sectional view illustrating another example of a state where the adjusted lens member (214) is fixed to the housing 201 by the fixing member 260, in FIG. 8A.

In the example illustrated in FIG. 13, if the lens member (214) pivots too much around the axis α, the lens member (214) abuts against either one of the pair of walls 252a and 252b before the bottom surface 201g. The gaps d4 and d4 between the lens member (214) and the pair of walls 252a and 252b are smaller than the gap d3 between the lens member (214) and the bottom surface 201g. Therefore, the pair of walls 252a and 252b act as the restrictor that restricts the lens member (214) from pivoting around the axis α.

The fixing member 260 is an adhesive that bonds the lens member (214) and the restrictors (252a, 252b) to fix the lens member (214) to the housing 201. Thus, after the lens member (214) is installed in the housing 201 to adjust the lens member (214), it is possible to apply an adhesive 262 to between the lens member (214) and the restrictors (252a and 252b), and as a result, it is possible to easily bond and fix the adjusted lens member (214) to the housing 201 with a simple operation. In this example, the adhesive 262 is an ultraviolet-curable adhesive.

It is noted that in this example, the lens member (214) and the pair of walls 252a and 252b are bonded to each other, but the contact Q between the housing-side engagement 251 and the lens member-side engagement 2141 may be further bonded.

Third Embodiment

Figure 14:
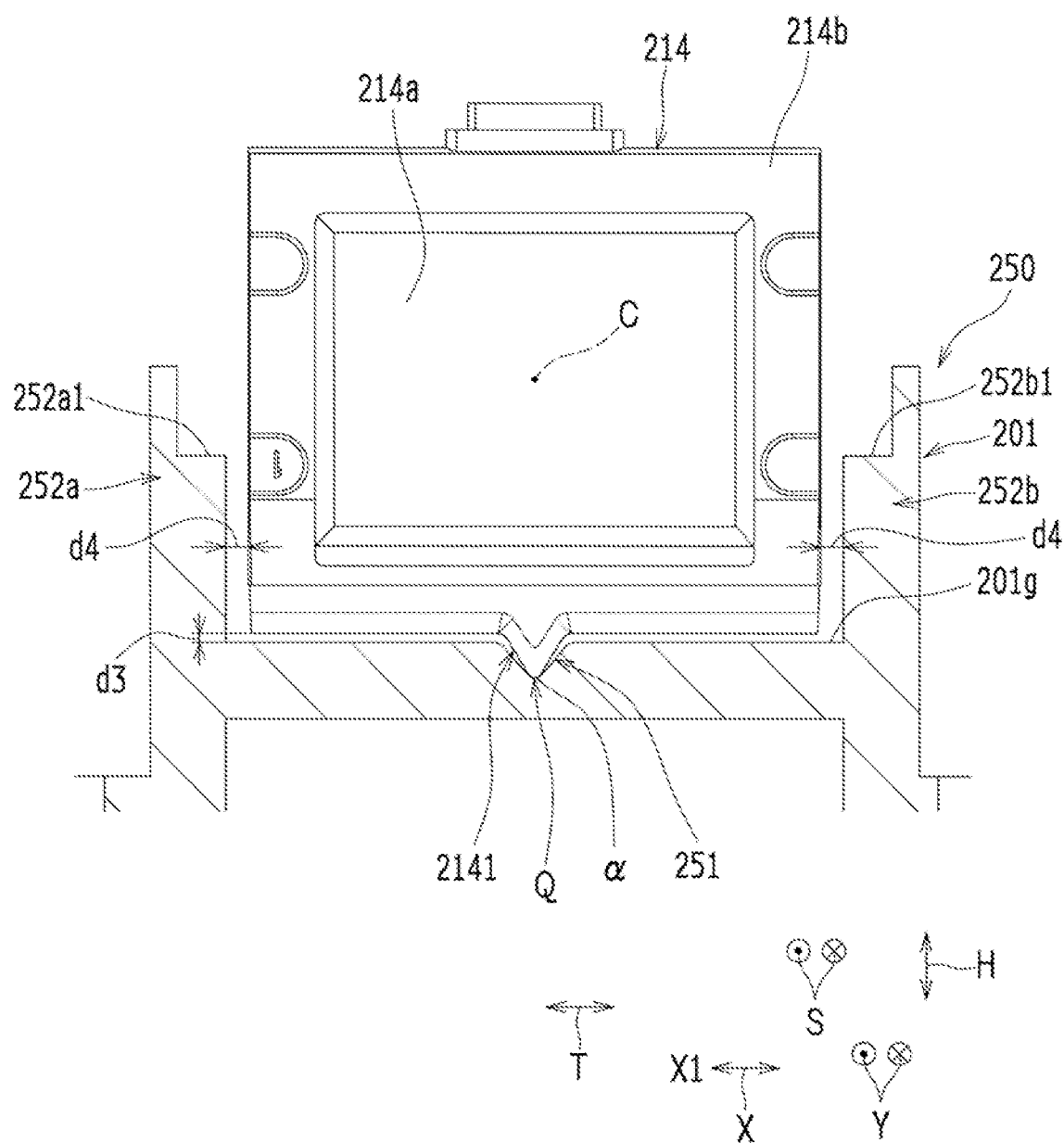
FIG. 14 is a cross-sectional view illustrating a configuration in which the lens member-side engagement is a protrusion and the housing-side engagement is a recess.
Figure 15:
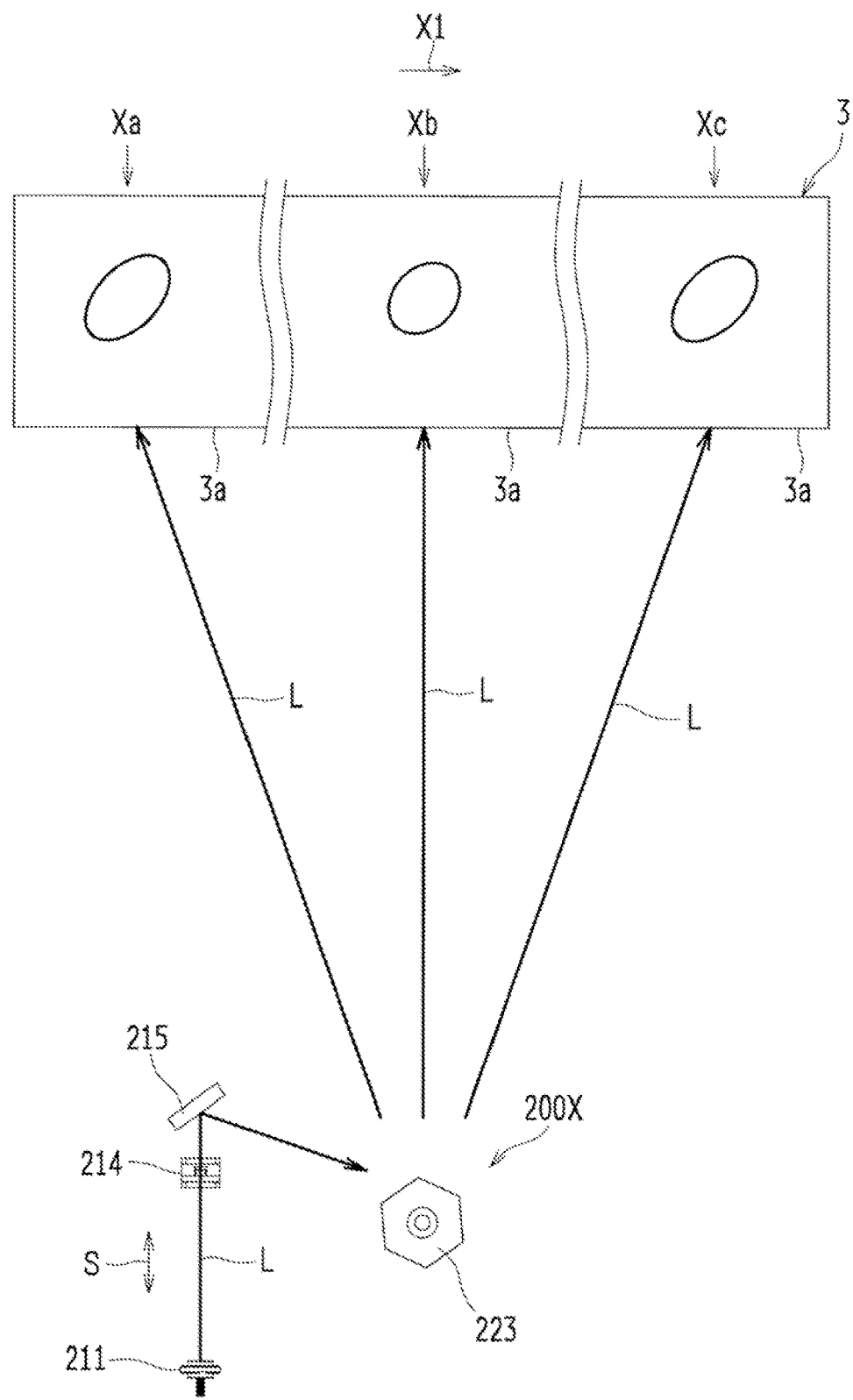
FIG. 15 is a schematic diagram illustrating cross sectional shapes of the light beam at an end on a writing start side in a main scanning direction, at a center therein, and at an end on a writing end side therein, in a state where a light beam emitted from an optical scanning device with a lens member being inclined around an axis along an optical axis direction enters, with irradiation, an image surface of a photoconductive drum.

FIG. 14 is a cross-sectional view illustrating a configuration in which the lens member-side engagement 2141 is a protrusion and the housing-side engagement 251 is a recess.

In the first embodiment and the second embodiment, the lens member-side engagement 2141 is a recess and the housing-side engagement 251 is a protrusion; however, as illustrated in an example of FIG. 14, the lens member-side engagement 2141 may be a protrusion and the housing-side engagement 251 may be a recess. Thus, even if the housing 201 provided with the housing-side engagement 251 being a recess is employed for another model of the optical scanning device, it is possible to install the lens member having a flat bottom surface in the housing 201 provided with the housing-side engagement 251 being a recess, and as a result, it is possible to use the housing 201 according to the present embodiment for a housing of another model of the optical scanning device.

In the third embodiment, the lens member (214) and the pair of walls 252a and 252b may be bonded, but instead thereof or in addition thereto, the contact Q between the housing-side engagement 251 and the lens member-side engagement 2141 may be bonded.

Further, if the lens member (214) pivots too much around the axis α, as illustrated in the example of FIG. 14, the lens member (214) may abut against the bottom surface 201g before either one of the pair of walls 252a and 252b, and may abut against either one of the pair of walls 252a and 252b before the bottom surface 201g.

Fourth Embodiment

In the first embodiment to the third embodiment, the pair of walls 252a and 252b are provided with steps 252a1 and 252b1 lower on an inside (lens member side). Thus, it is possible to facilitate workability of applying the adhesive 262 to a gap between the lens member (214) and the pair of walls 252a and 252b.

Further, in the first embodiment to the third embodiment, the pair of walls 252a and 252b (in this example, the steps 252a1 and 252b1) are provided with a plurality of (three in this example) grooves 253 to 253.

The grooves 253 to 253 may be used as an index (reference guide) for temporarily placing the lens member (214) before the lens member (214) is fixed to the housing 201. Thus, it is possible to previously place the lens member (214) at a rough position close to a normal position, and as a result, it is possible to facilitate workability of a position adjustment of the lens member (214) in the optical axis direction S. Alternatively/additionally, the adhesive 262 may be applied to the grooves 253 to 253. Thus, it is possible to easily apply the adhesive 262 to a gap between the lens member (214) and the pair of walls 252a and 252b.

The present invention is not limited to the embodiments described above, and can be implemented in various other forms. Thus, the embodiments are merely examples in all respects and should not be interpreted in a limiting manner. The scope of the present invention is defined by the claims, and is not restricted by the description of the specification in any way. All modifications and changes belonging to a scope equivalent to the claims are included within the scope of the present invention.

What is claimed is:

1. An optical scanning device, comprising: a light source that emits a light beam; a lens member; and a housing that supports the lens member, wherein
the housing and the lens member are provided with a housing-side engagement and a lens member-side engagement respectively that engage with each other,
the housing-side engagement and the lens member-side engagement are capable of pivoting the lens member around an axis that is along an optical axis direction of the light beam, and that passes through a contact contacted through concavo-convex engagement with each other,
the lens member-side engagement is a recess and the housing-side engagement is a protrusion or the lens member-side engagement is a protrusion and the housing-side engagement is a recess,
the lens member includes a frame body that surrounds a lens,
the housing-side engagement is arranged on a bottom surface of the housing,
the lens member-side engagement is provided on a bottom surface of the frame body, and
the recess and the protrusion extend in the optical axis direction.

2. The optical scanning device according to claim 1, wherein
the housing-side engagement and the lens member-side engagement are capable of moving the lens member in the optical axis direction.

3. The optical scanning device according to claim 1, wherein
the recess includes a pair of recess-side inclinations inclined to spread to both sides toward a side of the protrusion engaged in an orthogonal direction orthogonal to the optical axis direction, and
the protrusion includes a pair of protrusion-side inclinations inclined to be narrowed from both sides toward a side of the recess engaged in a width direction orthogonal both to one direction of the lens of the lens member and the optical axis direction.

4. The optical scanning device according to claim 3, wherein
a first inclination angle formed by the pair of recess-side inclinations is larger than a second inclination angle formed by the pair of protrusion-side inclinations.

5. The optical scanning device according to claim 3, wherein
an intersection of the pair of recess-side inclinations and an intersection of the pair of protrusion-side inclinations are both curved surface shapes, and when R1 denotes a radius of curvature of the intersection of the pair of recess-side inclinations and R2 denotes a radius of curvature of the intersection of the pair of protrusion-side inclinations, a relationship of R1>R2 is satisfied.

6. The optical scanning device according to claim 3, wherein
the lens member-side engagement is a recess and the housing-side engagement is a protrusion, and corners between an incident side surface of the lens member on which the light beam is incident and an emission side surface of the lens member from which the light beam emits, and the pair of recess-side inclinations are curved surface shapes.

7. The optical scanning device according to claim 1, wherein
in a width direction orthogonal both to one direction of the lens of the lens member and the optical axis direction, a center of the contact is aligned with a center of a curved surface configuring the lens of the lens member.

8. The optical scanning device according to claim 1, wherein
the lens member is a cylindrical lens.

9. The optical scanning device according to claim 1, wherein
the lens member is fixed to the housing by a fixing member.

10. The optical scanning device according to claim 9, wherein
the fixing member is an adhesive that bonds the contact between the housing-side engagement and the lens member-side engagement to fix the lens member to the housing.

11. The optical scanning device according to claim 1, wherein the housing is provided with a restrictor that restricts the lens member from pivoting around the axis.

12. The optical scanning device according to claim 11, wherein the lens member is fixed to the housing by a fixing member, and the fixing member is an adhesive that bonds the lens member and the restrictor to fix the lens member to the housing.

13. An image forming apparatus comprising the optical scanning device according to claim 1.

14. The optical scanning device according to claim 1, wherein a length of the bottom surface of the frame body in the optical axis direction is longer than a length of a top surface of the frame body in the optical axis direction.

15. The optical scanning device according to claim 1, wherein the housing includes a support that supports the lens member so that the light beam passes through the lens, the support is provided with a pair of walls facing both side surfaces of the lens member in a width direction orthogonal both to one direction of the lens of the lens member and the optical axis direction, the pair of walls are erected from the bottom surface of the housing, and the pair of walls are provided with steps lower on a side of the lens member.

* * * * *